(12) United States Patent
Sugaya

(10) Patent No.: US 8,332,547 B2
(45) Date of Patent: Dec. 11, 2012

(54) POWER EXCHANGE DEVICE, POWER EXCHANGE METHOD, PROGRAM, AND POWER EXCHANGE SYSTEM

(75) Inventor: Shigeru Sugaya, Kanagawa (JP)

(73) Assignee: Sony Corporation, Tokyo (JP)

( * ) Notice: Subject to any disclaimer, the term of this patent is extended or adjusted under 35 U.S.C. 154(b) by 80 days.

(21) Appl. No.: 12/416,250

(22) Filed: Apr. 1, 2009

(65) Prior Publication Data

US 2009/0251008 A1    Oct. 8, 2009

(30) Foreign Application Priority Data

Apr. 4, 2008    (JP) ............................... P2008-098612

(51) Int. Cl.
*G06F 3/00*    (2006.01)
*G06F 1/00*    (2006.01)

(52) U.S. Cl. .......... 710/18; 713/300; 713/340; 320/106; 320/134

(58) Field of Classification Search ...................... 710/18
See application file for complete search history.

(56) References Cited

U.S. PATENT DOCUMENTS

| 6,747,436 | B2 * | 6/2004 | Brotto ........................... | 320/106 |
| 7,375,493 | B2 * | 5/2008 | Calhoon et al. ............... | 320/108 |
| 2006/0184705 | A1 * | 8/2006 | Nakajima ..................... | 710/303 |
| 2007/0236975 | A1 * | 10/2007 | Lippojoki et al. .............. | 363/66 |

FOREIGN PATENT DOCUMENTS

| JP | 2003-029885 | 1/2003 |
| JP | 2004-252562 | 9/2004 |
| JP | 2005-151476 | 6/2005 |
| JP | 2005-151609 | 6/2005 |
| JP | 2006-238548 | 9/2006 |
| JP | 2007-034614 | 2/2007 |

OTHER PUBLICATIONS

Japanese Office Action issued on Nov. 24, 2010, in corresponding Japanese Patent Application JP 2008-098612.
Japanese Office Action dated Aug. 23, 2011, issued in corresponding Japanese Patent Application No. 2008-098612.

* cited by examiner

*Primary Examiner* — Henry Tsai
*Assistant Examiner* — Dean Phan
(74) *Attorney, Agent, or Firm* — Finnegan, Henderson, Farabow, Garrett & Dunner, L.L.P.

(57) ABSTRACT

A power exchange device includes: a connection portion that is connected to another device; a wireless communication portion that performs wireless communication with a power exchange device in the vicinity; a power exchange portion that exchanges power with the power exchange device in the vicinity; a power management portion that causes the power exchanged by the power exchange portion to be input and output between the connection portion and the other device; and a power control portion that, after the wireless communication portion has performed the wireless communication with the power exchange device in the vicinity, controls whether to cause the power exchange portion to exchange power with the power exchange device in the vicinity depending on a power source state of the other device.

12 Claims, 20 Drawing Sheets

FIG.2
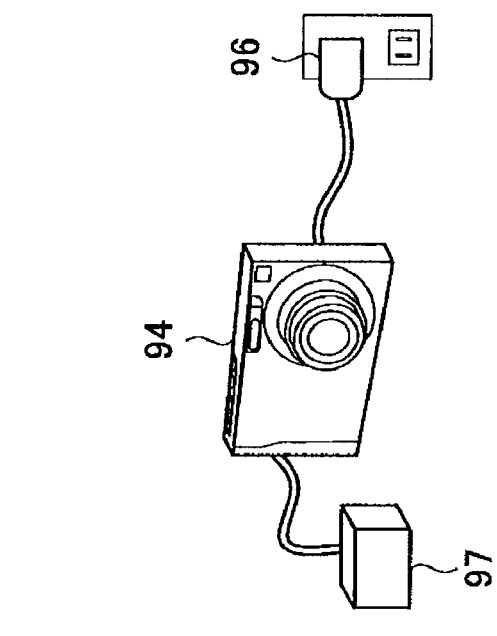
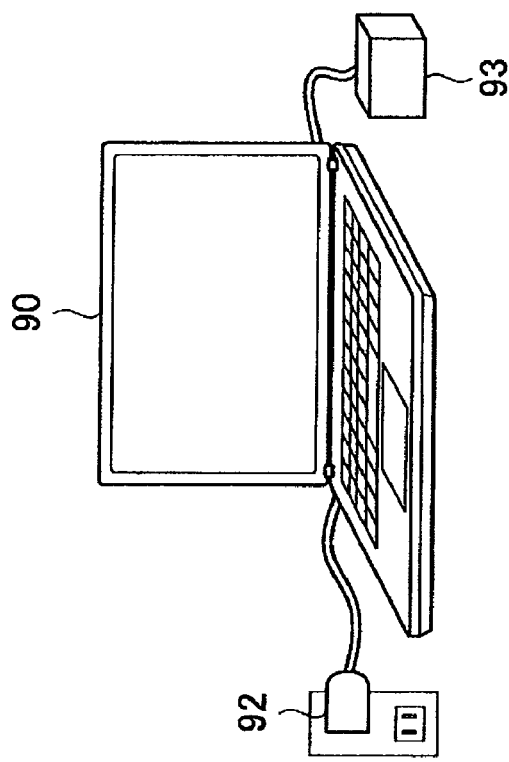

FIG.7

| CONNECTION NUMBER | SIGNAL NAME | ASSIGNED COLOR |
|---|---|---|
| 1 | VBUS | RED |
| 2 | D- | WHITE |
| 3 | D+ | GREEN |
| 4 | GND | BLACK |
| Shell | Shield | Drain Wire |

FIG.11

| POWER TRANSMISSION INFORMATION ELEMENT (Power Transmission IE) | | | | | |
|---|---|---|---|---|---|
| ELEMENT IDENTIFIER | INFORMATION LENGTH | USABLE POWER TRANSMISSION FORMAT | USABLE POWER RECEPTION FORMAT | MAXIMUM TRANSMITTABLE POWER AMOUNT | MAXIMUM RECEIVABLE POWER AMOUNT |
| 721 | 722 | 723 | 724 | 725 | 726 |

FIG.12

| POWER TRANSMISSION REQUEST INFORMATION ELEMENT (Power Transmission Request IE) | | | | | |
|---|---|---|---|---|---|
| ELEMENT IDENTIFIER | INFORMATION LENGTH | POWER TRANSMISSION SOURCE ADDRESS | POWER RECEPTION FORMAT | DESIRED POWER RECEPTION AMOUNT | POWER RECEPTION TIME SLOT |
| 731 | 732 | 733 | 734 | 735 | 736 |

FIG.13

| POWER TRANSMISSION RESPONSE INFORMATION ELEMENT (Power Transmission Response IE) | | | | | |
|---|---|---|---|---|---|
| ELEMENT IDENTIFIER | INFORMATION LENGTH | POWER TRANSMISSION DESTINATION ADDRESS | POWER TRANSMISSION FORMAT | AGREED POWER TRANSMISSION AMOUNT | POWER TRANSMISSION TIME SLOT |
| 741 | 742 | 743 | 744 | 745 | 746 |

FIG.14

| POWER TRANSMISSION TERMINATION INFORMATION ELEMENT | | |
|---|---|---|
| ELEMENT IDENTIFIER | INFORMATION LENGTH | POWER TRANSMISSION SOURCE ADDRESS |
| 751 | 752 | 753 |

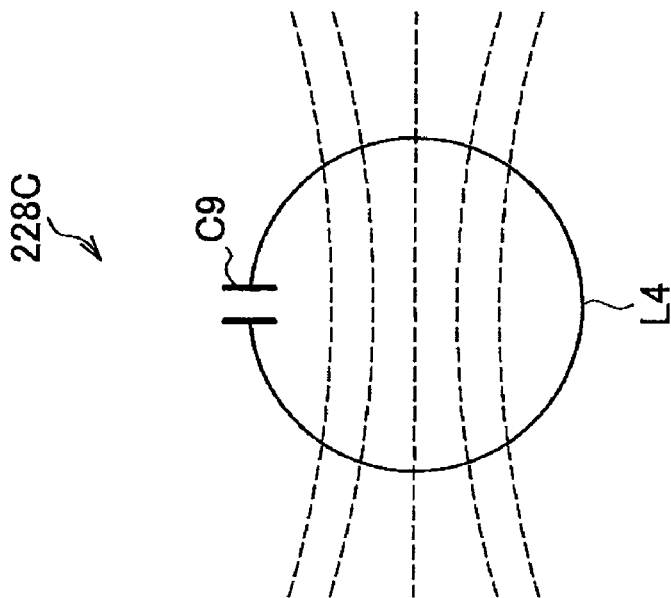
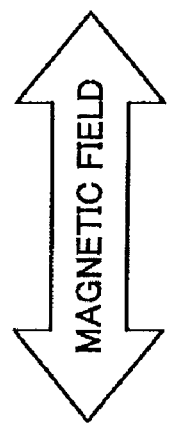
FIG.16C
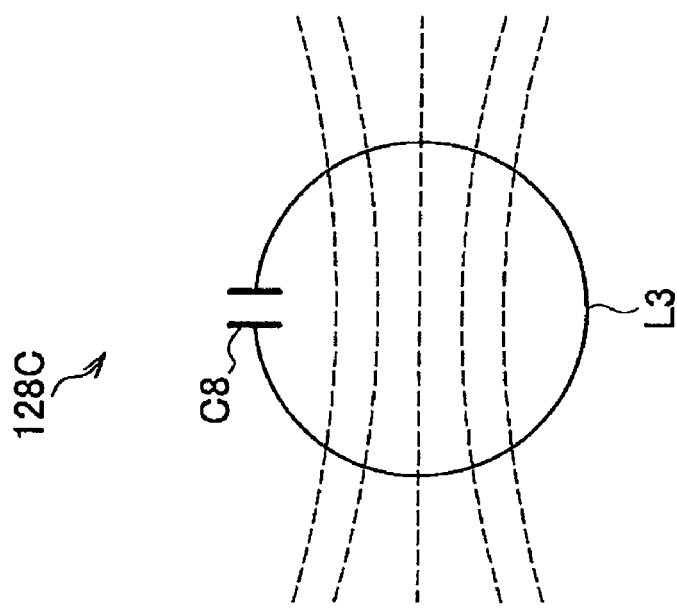

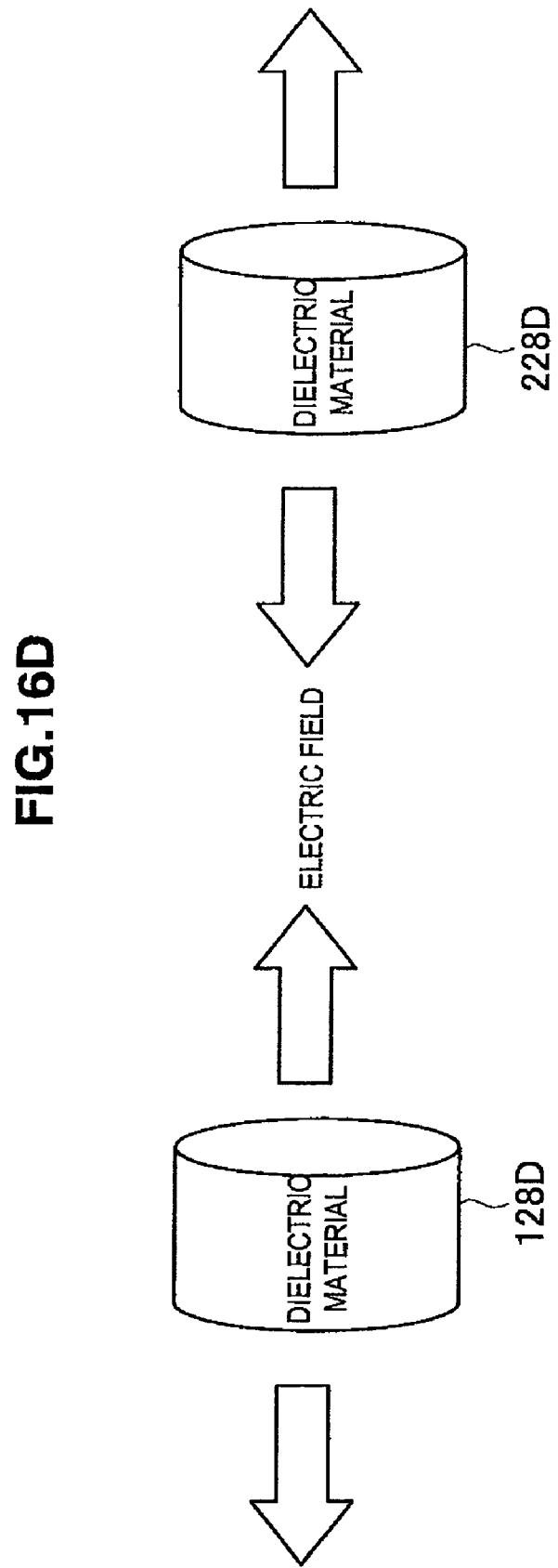

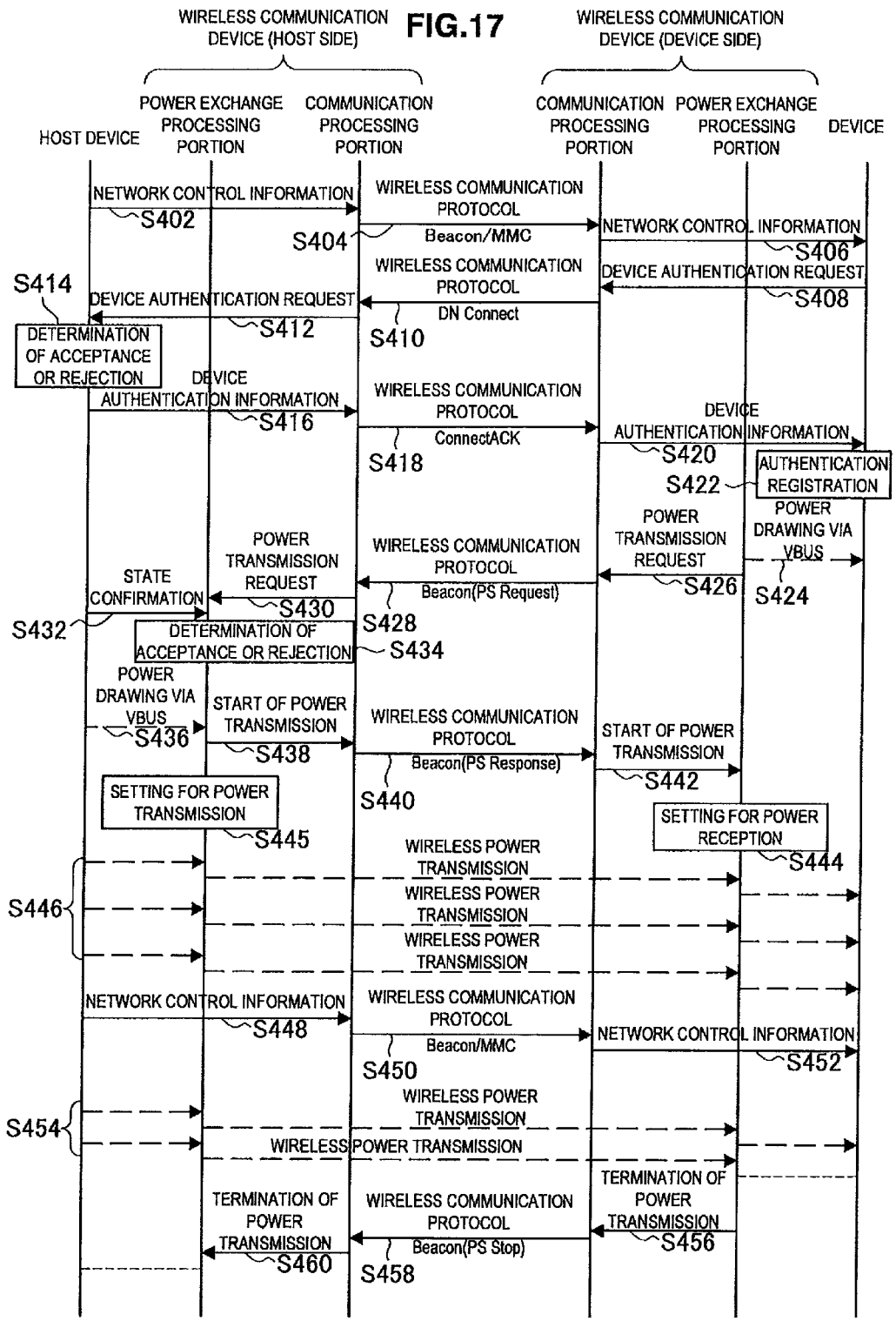

POWER EXCHANGE DEVICE, POWER EXCHANGE METHOD, PROGRAM, AND POWER EXCHANGE SYSTEM

BACKGROUND OF THE INVENTION

1. Field of the Invention

The present invention relates to a power exchange device, a power exchange method, a program, and a power exchange system.

2. Description of the Related Art

Currently, a universal serial bus (USB) port for connecting to another information processing device tends to be provided in information processing devices. When a USB port of an information processing device and a USB port of another information processing device are connected by a universal serial bus (USB) cable, power exchange can be achieved as well as data communication between the devices.

More specifically, when a predetermined voltage is applied to a "VBUS" of the USB port of a host-side information processing device, a device-side information processing device can obtain the predetermined voltage via the "VBUS" of the USB port of the device itself.

Further, recently, wireless power transmission devices have been proposed that can transmit electric power wirelessly. An example of the wireless power transmission devices is described in, for example, Japanese Patent Application Publication No. JP-A-2006-238548. More specifically, the wireless power transmission device described in JP-A-2006-238548 aims to improve power transmission efficiency, and displays a screen corresponding to the result of electric power reception by a power receiving device.

In addition, standardization measures for wireless USB systems that perform data exchange by replacing a wired USB cable with a wireless communication protocol have been completed. The wireless USB system is superior in terms of user friendliness, because it is not necessary to physically connect information processing devices using a USB cable when performing data communication between the information processing devices.

SUMMARY OF THE INVENTION

However, there has been a problem that power exchange cannot be performed in the wireless USB system because there is no "VBUS" of the USB port. Further, the wireless power transmission device described in JP-A-2006-238548 does not take into account a power source state on its device side or a power source state on the power receiving device side. Accordingly, there have been concerns that electric power is transmitted unnecessarily.

The present invention addresses the problems described above and provides a power exchange device, a power exchange method, a program, and a power exchange system that are new and improved and that are capable of controlling whether or not to exchange power more appropriately.

According to an embodiment of the present invention, there is provided a power exchange device that includes: a connection portion that is connected to another device; a wireless communication portion that performs wireless communication with a power exchange device in the vicinity; a power exchange portion that exchanges power with the power exchange device in the vicinity; a power management portion that causes the power exchanged by the power exchange portion to be input and output between the connection portion and the other device; and a power control portion that, after the wireless communication portion has performed the wireless communication with the power exchange device in the vicinity, controls whether to cause the power exchange portion to exchange power with the power exchange device in the vicinity depending on a power source state of the other device.

With this configuration, the power control portion controls whether to cause the power exchange portion to exchange power with the power exchange device in the vicinity, depending on the power source state of the other device, and the power management portion causes the power exchanged by the power exchange portion to be input and output between the connection portion and the other device.

The power control portion may control whether to cause the power exchange portion to exchange power after an authentication process with the power exchange device in the vicinity has been performed via the wireless communication portion.

When the wireless communication portion has received from the power exchange device in the vicinity a power transmission request that requests power transmission, the power control portion may control whether to cause the power exchange portion to transmit power to the power exchange device in the vicinity depending on a power source state of the other device.

The power transmission request may include, as a condition relating to power transmission, at least one of an amount of power, a format of power transmission, and information indicating a time slot during which transmission is required. When the power control portion causes the power exchange portion to transmit power to the power exchange device in the vicinity, the power control portion may cause the power to be transmitted in accordance with the condition relating to the power transmission.

When the wireless communication portion has received a power transmission termination request from the power exchange device in the vicinity, the power control portion may terminate the power transmission from the power exchange portion.

The power exchange device may further include a communication control portion that causes the wireless communication portion to transmit a power transmission request that requests the power exchange device in the vicinity to transmit power when the power control portion determines that the power exchange device in the vicinity will transmit power.

According to another embodiment of the present invention, there is provided a power exchange method that includes the steps of: performing wireless communication with a power exchange device in the vicinity; determining whether to exchange power based on a power source state of another device that is connected; exchanging power with the power exchange device in the vicinity when it is determined that power is to be exchanged; and causing the power that is exchanged with the power exchange device in the vicinity to be input into and output from the other device.

According to another embodiment of the present invention, there is provided a program that includes instructions that command a computer to function as: a connection portion that is connected to another device; a wireless communication portion that performs wireless communication with a power exchange device in the vicinity; a power exchange portion that exchanges power with the power exchange device in the vicinity; a power management portion that causes the power exchanged by the power exchange portion to be input and output between the connection portion and the other device; and a power control portion that, after the wireless communication portion has performed the wireless communication with the power exchange device in the vicinity, controls whether to cause the power exchange portion to exchange power with the power exchange device in the vicinity depending on a power source state of the other device.

According to another embodiment of the present invention, there is provided a power exchange system that includes a power receiving device and a power transmission device. The power receiving device includes a first connection portion that is connected to a power using device, a first wireless communication portion that performs wireless communication, a power receiving portion that receives transmitted power, and a first power management portion that causes the power received by the power receiving portion to be output from the first connection portion to the power using device. The power transmission device includes a second connection portion that is connected to a power supply device, a second wireless communication portion that performs wireless communication with the first wireless communication portion of the power receiving device, a power transmission portion that transmits to the power receiving device power supplied from the power supply device, and a power control portion that, after the second wireless communication portion has performed the wireless communication with the first wireless communication portion of the power receiving device, controls whether to cause the power transmission portion to transmit power to the power receiving device, depending on a power source state of one of the power using device and the power supply device.

According to the embodiments of the present invention described above, it is possible to control whether or not to exchange power more appropriately.

BRIEF DESCRIPTION OF THE DRAWINGS

FIG. 2 is an explanatory diagram showing an example of the configuration of a wireless communication system relating to the present embodiment;

FIG. 7 is an explanatory diagram showing a signal line arrangement of a USB port;

FIG. 11 is an explanatory diagram showing an example of the structure of a power transmission information element (Power Transmission IE);

FIG. 12 is an explanatory diagram showing an example of the structure of a power transmission request information element (Power Transmission Request IE);

FIG. 13 is an explanatory diagram showing an example of the structure of a power transmission response information element (Power Transmission Response IE);

FIG. 14 is an explanatory diagram showing an example of the structure of a power transmission termination information element (Power Transmission Termination IE);

FIG. 16C is an explanatory diagram showing the configuration of power exchange portions that operate in a magnetic field resonance system;

FIG. 16D is an explanatory diagram showing the configuration of power exchange portions that operate in an electric field resonance system;

FIG. 17 is a sequence diagram showing the flow of the operation of the power exchange system according to the present embodiment;

DETAILED DESCRIPTION OF THE PREFERRED EMBODIMENTS

Figure 1:
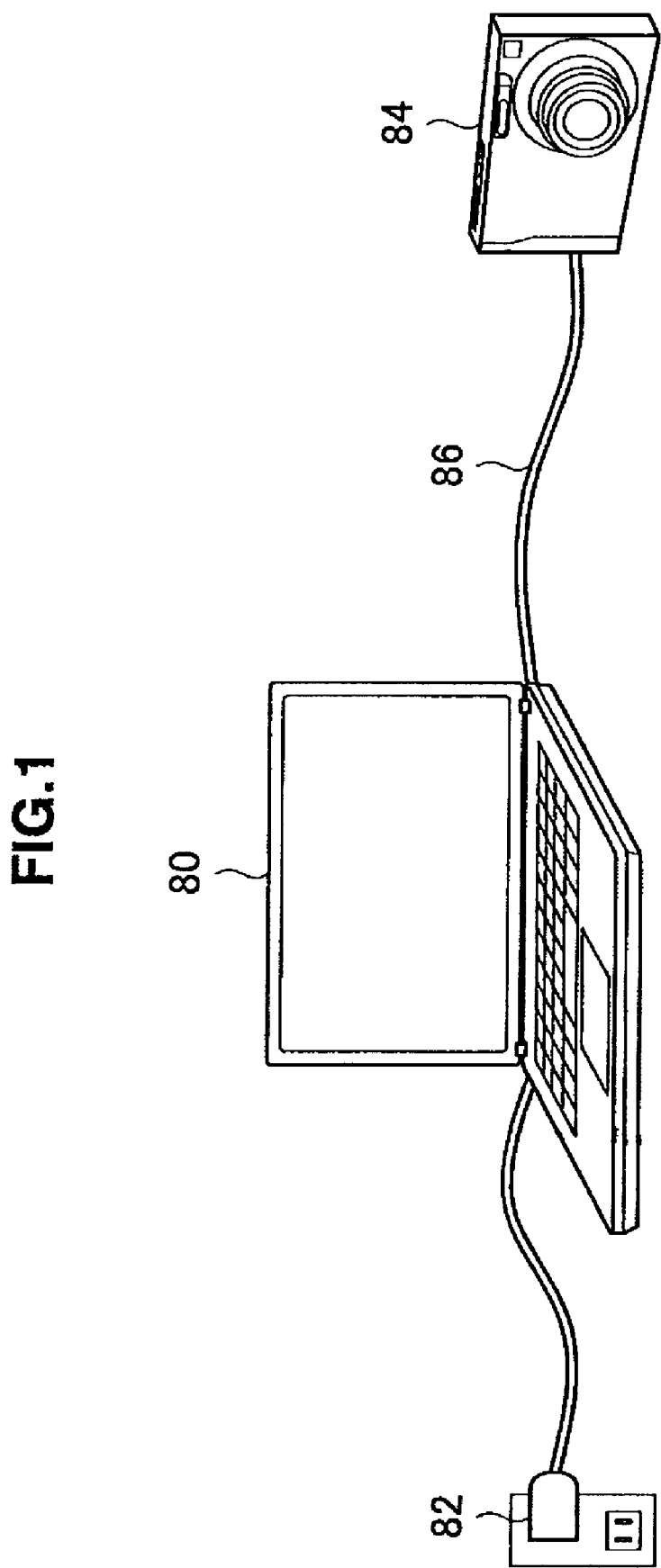
FIG. 1 is an explanatory diagram showing an example of the configuration of a wired communication system relating to the present embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The preferred embodiment for practicing the present invention will be explained in the order shown below.

1. Overview of power exchange system according to the present embodiment
2. Configurations of wireless communication devices included in power exchange system
3. Practical examples of power exchange
4. Operation of power exchange system according to the present embodiment
5. Operation of host-side wireless communication device
6. Operation of device-side wireless communication device
7. Conclusion

1. OVERVIEW OF POWER EXCHANGE SYSTEM ACCORDING TO THE PRESENT EMBODIMENT

First, communication systems relating to the present embodiment will be described as comparative examples with reference to FIG. 1 and FIG. 2. Then, after a description of the background of the present embodiment, a power exchange system according to the present embodiment will be schematically described with reference to FIG. 3 to FIG. 5.

Communication Systems Relating to the Present Embodiment

FIG. 1 is an explanatory diagram showing an example of the configuration of a wired communication system relating to the present embodiment. As shown in FIG. 1, the wired communication system includes a personal computer (PC) 80 and an imaging device 84. A connection port of the PC 80 and a connection port of the imaging device 84 are connected by a USB cable 86. The PC 80 functions as a USB host, and the imaging device 84 functions as a USB device.

In this wired communication system, selected data such as image data and video data can be transmitted and received between the PC 80 and the imaging device 84 via the USB cable 86. In addition, the PC 80 can obtain electric power via a power supply plug 82 connected to an alternating current (AC) power source, and supply the obtained electric power to the imaging device 84 through the connection ports and the USB cable 86.

Therefore, in the wired communication system, the imaging device 84 can operate by obtaining electric power through the USB cable 86, without having to connect the imaging device 84 to an external AC power source. Next, a wireless communication system relating to the present embodiment will be described with reference to FIG. 2.

FIG. 2 is an explanatory diagram showing an example of the configuration of a wireless communication system relating to the present embodiment. As shown in FIG. 2, the wireless communication system is compliant with the wireless USB standard, and includes a PC 90 that functions as a USB host, and an imaging device 94 that functions as a USB device. A connection port of the PC 90 is connected to a wireless communication device 93, and a connection port of the imaging device 94 is connected to a wireless communication device 97.

In this wireless communication system, the wireless communication device 93 and the wireless communication device 97 operate in accordance with a predetermined protocol. Thus, the PC 90 and the imaging device 94 can transmit and receive selected data via the wireless communication device 93 and the wireless communication device 97.

In addition, the PC 90 can obtain electric power via a power supply plug 92 connected to an AC power source, and supply the obtained electric power to the wireless communication device 93 through the connection ports, thereby causing the wireless communication device 93 to operate. However, electric power cannot be supplied from the PC 90 to the imaging device 94 in the wireless communication system, unlike the wired communication system. Accordingly, as shown in FIG. 2, the imaging device 94 needs to obtain electric power via a power supply plug 96 or to use electric power of a built-in secondary battery in order to cause the wireless communication device 97 to operate.

BACKGROUND OF THE PRESENT EMBODIMENT

As described above, since there is no "VBUS" of the USB port in the wireless USB system, there is a problem that electric power cannot be supplied to a USB device. Accordingly, there is a problem that the USB device has to use an internal battery to cause a wireless communication function to operate.

Moreover, in a known wired USB, when a USB device with a simple structure such as a mouse is used, electric power for driving the mouse is supplied via the "VBUS" of the USB port. When assuming that the mouse is connected to a PC using a wireless USB, it is necessary to provide a battery in the mouse because electric power is not supplied from the PC to the mouse.

A USB device such as an imaging device (a digital still camera) can transfer an image data to a PC by a wireless USB. However, for example, when a battery capacity of the USB device is small, it is necessary to supply electric power to the USB device from an AC power source.

A method described in Japanese Patent Application Publication No. JP-A-2006-238548 is a method for supplying electric power to cause a power receiving device to operate. This method cannot supply electric power to an application device connected to the power receiving device. Further, a power transmission device needs to transmit a signal for the power receiving device, and the power receiving device needs to transmit a response signal when it detects the signal of the power transmission device. As a result, a battery needs to be mounted also in the power receiving device. Furthermore, there is a problem that the power transmission device transmits electric power to a device that does not need to be supplied with electric power.

In light of the above-described circumstances, the power exchange system according to the present embodiment has been created. According to the power exchange system of the present embodiment, it is possible to control whether or not to exchange power more appropriately. Hereinafter, an overview of the power exchange system will be described with reference to FIG. 3 to FIG. 5.

Overview of the Power Exchange System

Figure 3:
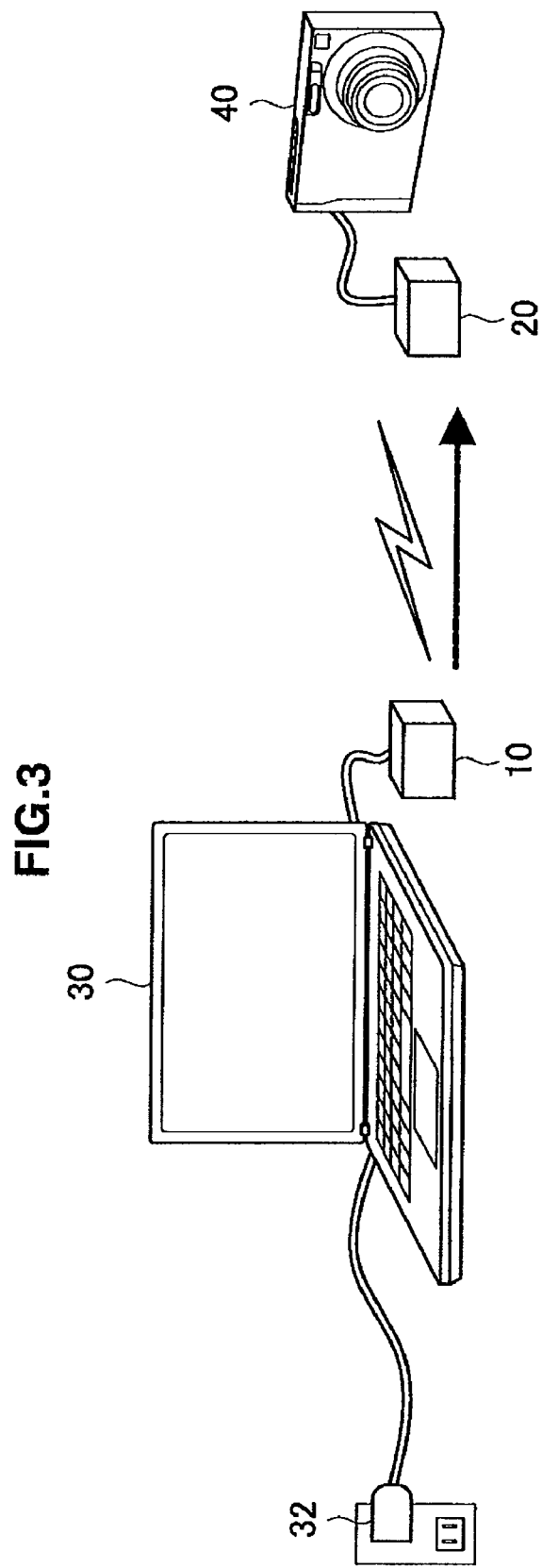
FIG. 3 is an explanatory diagram showing an example of the configuration of a power exchange system according to the present embodiment.
Figure 4:
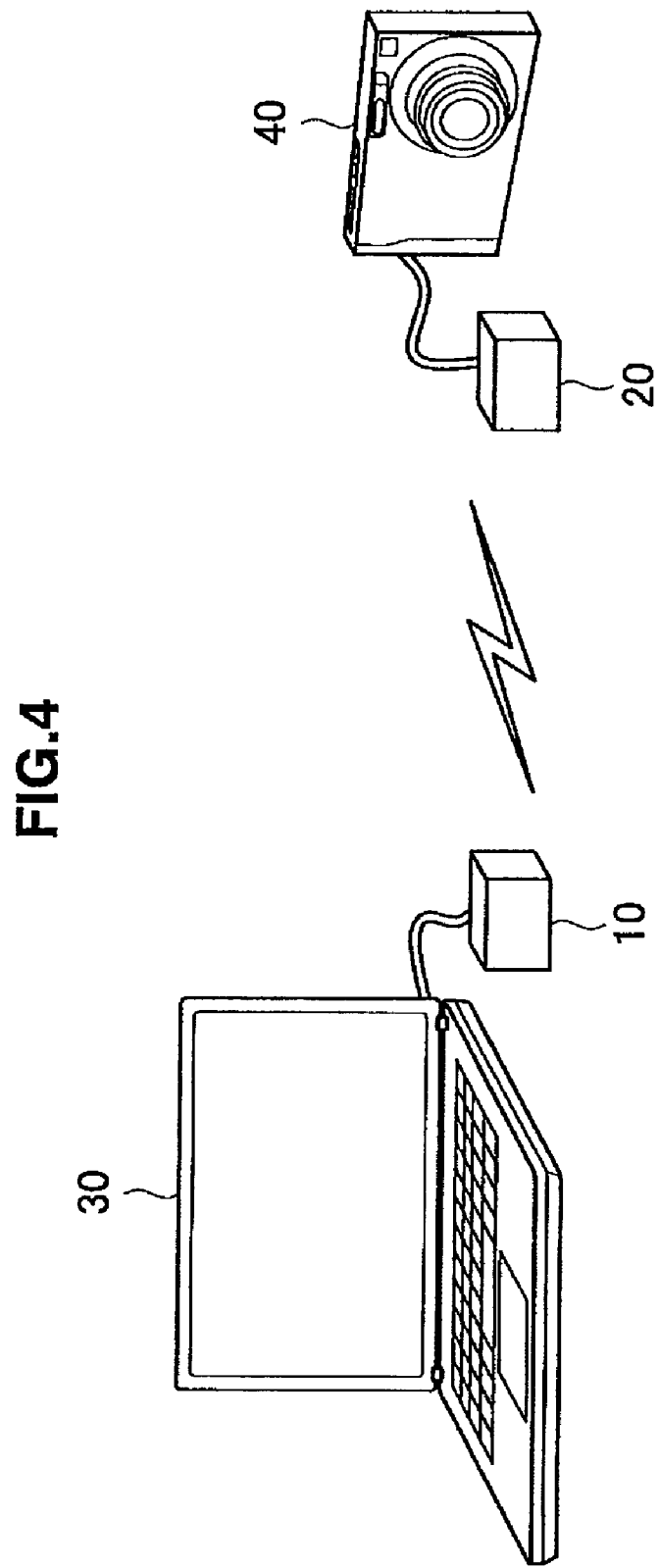
FIG. 4 is an explanatory diagram showing an example of the configuration of the power exchange system according to the present embodiment.
Figure 5:
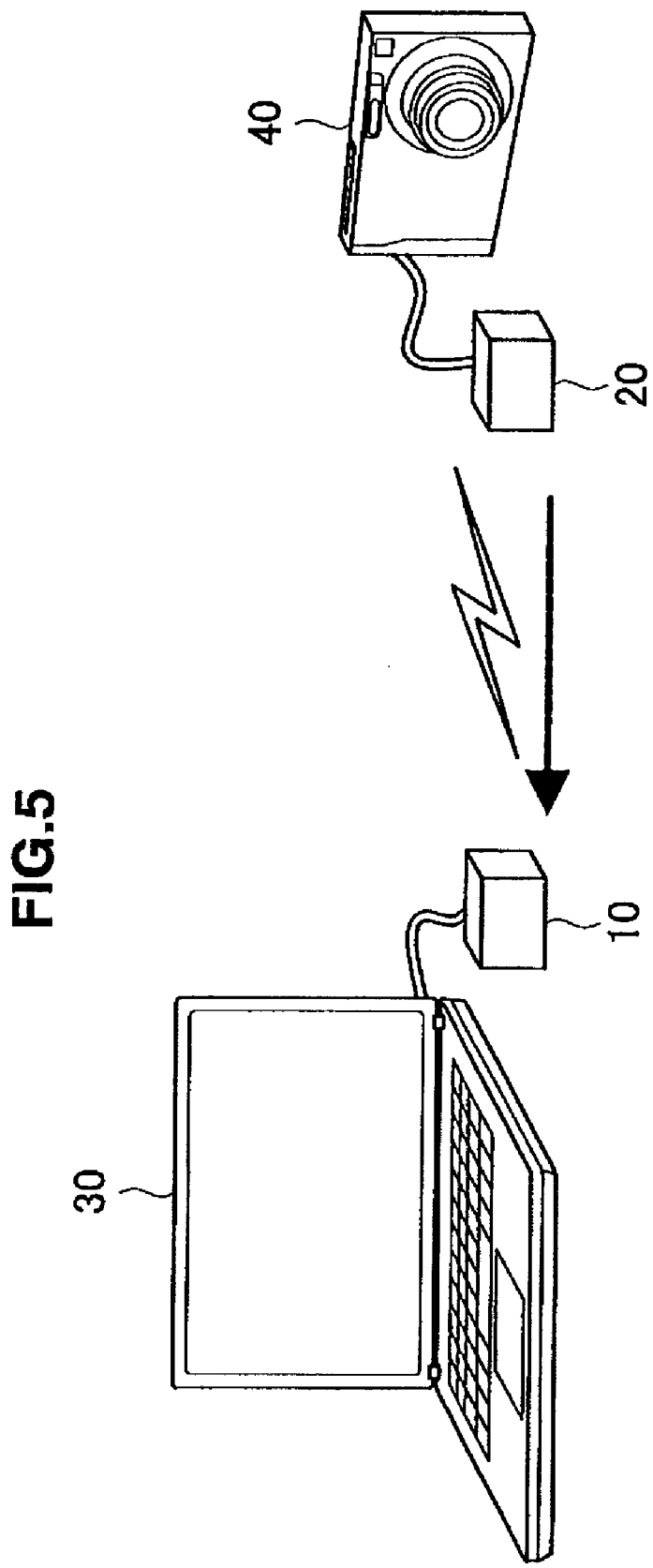
FIG. 5 is an explanatory diagram showing an example of the configuration of the power exchange system according to the present embodiment.

FIG. 3 to FIG. 5 are explanatory diagrams each showing an example of the configuration of the power exchange system according to the present embodiment. As shown in FIG. 3, the power exchange system according to the present embodiment is compliant with the wireless USB standard, and includes a host device 30 that functions as a USB host, and a device 40 that functions as a USB device. A connection port of the host device 30 is connected to a wireless communication device 10 (power transmission device, power exchange device), and a connection port of the device 40 is connected to a wireless communication device 20 (power receiving device, power exchange device).

In this power exchange system, the wireless communication device 10 and the wireless communication device 20 operate in accordance with a predetermined protocol. Thus, the host device 30 and the device 40 can transmit and receive selected data via the wireless communication device 10 and the wireless communication device 20. Note that the selected data may include audio data such as music, a lecture, a radio program, or the like, visual data such as a motion picture, a television program, a video program, a photograph, a document, a painting, a diagram, or the like, and any other data, such as a game, software, or the like.

The host device 30 can obtain electric power via a power supply plug 32 connected to an AC power source, and supply the obtained electric power to the wireless communication device 10 through the connection port, thereby causing the wireless communication device 10 to operate. As shown by the dotted line in FIG. 3, the wireless communication device 10 can transmit the electric power supplied from the host device 30 to the wireless communication device 20. As a result, the device 40 can operate based on the electric supplied from the wireless communication device 20 even when it is not connected to an AC power source.

In FIG. 3, a PC is shown as an example of the host device 30, and an imaging device is shown as an example of the device 40. However, the host device 30 and the device 40 may be any information processing device. The information processing device may also be a home video processing device (a DVD recorder, a video deck, or the like), a mobile telephone, a Personal Handyphone System (PHS), a mobile music playback device, a mobile video processing device, a personal digital assistant (PDA), a home game console, a mobile game console, a household electrical appliance, or the like.

In the example shown in FIG. 3, the host device 30 is supplied with electric power from the AC power source via the power supply plug 32. When the host device 30 is not supplied with electric power from the AC power source, as shown in FIG. 4, the host device 30 operates based on a built-in secondary battery. When the host device 30 is not supplied with electric power from the AC power source in this manner, or when a remaining capacity of the secondary battery is smaller than a predetermined reference value, power transmission from the wireless communication device 10 to the wireless communication device 20 is not performed, as shown in FIG. 4.

As shown in FIG. 5, even when both the host device 30 and the device 40 are not supplied with electric power from an AC power source, if the remaining capacity of the secondary battery of the device 40 is sufficient, the wireless communication device 20 can transmit electric power to the wireless communication device 10. Similarly, if the remaining capacity of the secondary battery of the host device 30 is sufficient, the wireless communication device 10 can transmit electric power to the wireless communication device 20.

In this manner, the power exchange system according to the present embodiment can control whether or not power exchange is performed dependent on a power source state of the host device 30 or the device 40. Hereinafter, the configurations of the wireless communication device 10 and the wireless communication device 20 that are included in the power exchange system according to the present embodiment will be described.

2. CONFIGURATIONS OF WIRELESS COMMUNICATION DEVICES INCLUDED IN POWER EXCHANGE SYSTEM

Figure 6:
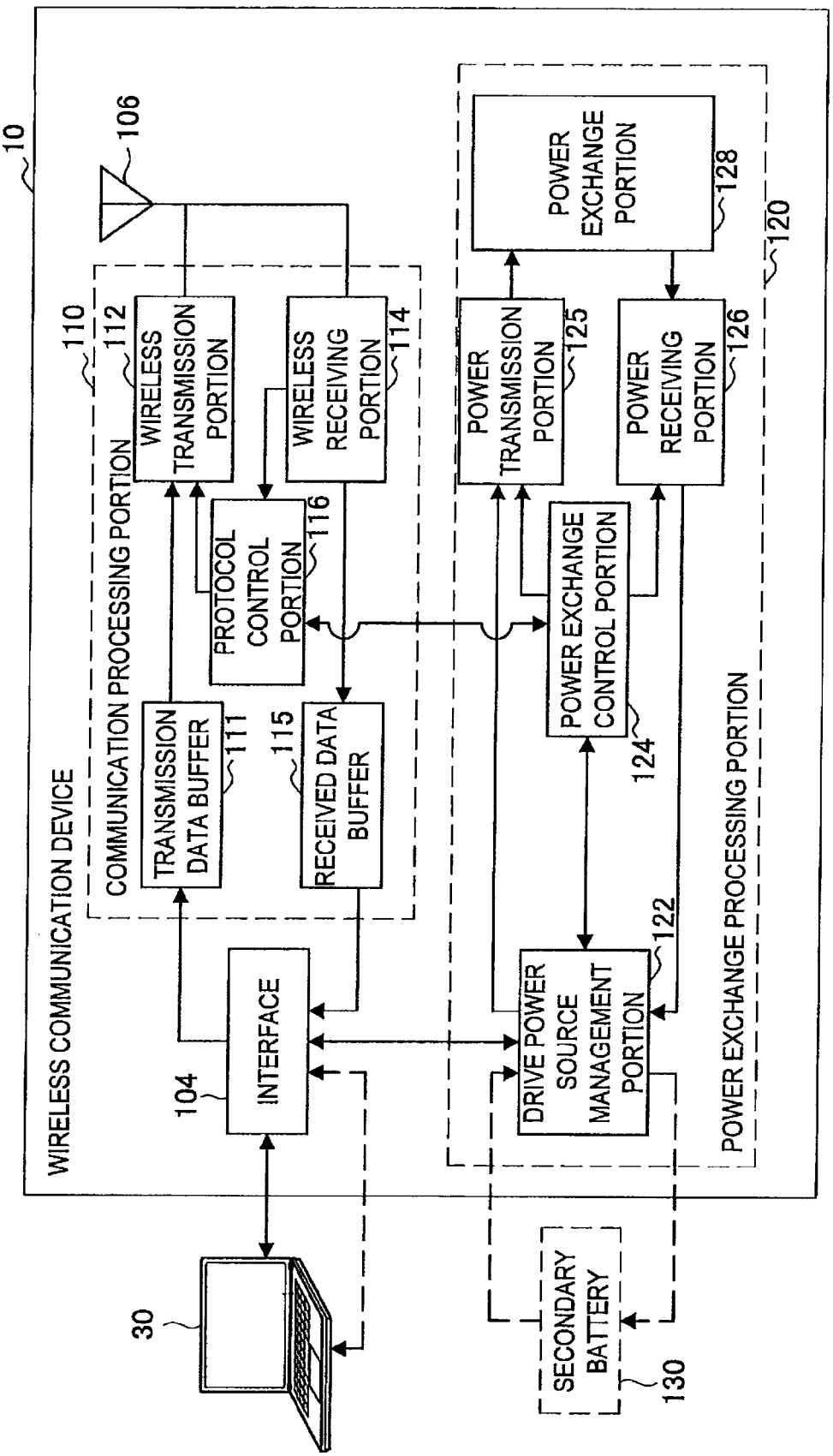
FIG. 6 is a functional block diagram showing the configuration of a wireless communication device connected to a host device.

FIG. 6 is a functional block diagram showing the configuration of the wireless communication device 10 connected to the host device 30. As shown in FIG. 6, the wireless communication device 10 includes an interface 104, an antenna 106, a communication processing portion 110, a power exchange processing portion 120, and a secondary battery 130. Further, the communication processing portion 110 includes a transmission data buffer 111, a wireless transmission portion 112, a wireless receiving portion 114, a received data buffer 115, and a protocol control portion 116. Further, the power exchange processing portion 120 includes a drive power source management portion 122, a power exchange control portion 124, a power transmission portion 125, a power receiving portion 126, and a power exchange portion 128.

The interface 104 functions as a connection portion that is physically connected to the host device 30. The interface 104 may be a USB port, for example, and the wireless communication device 10 and the host device 30 may be connected by a wired USB. Here, a signal line arrangement of the USB port will be described with reference to FIG. 7.

FIG. 7 is an explanatory diagram showing the signal line arrangement of the USB port. As shown in FIG. 7, a signal line with the connection number 1 corresponds to VBUS for input and output electric power, and the color red is assigned. Note that, in FIG. 6, the VBUS is shown by the dotted arrow between the interface 104 and the host device 30.

Similarly, a signal line with the connection number 2 corresponds to D−(minus) for transmitting negative data, and the color white is assigned. A signal line with the connection number 3 corresponds to D+(plus) for transmitting positive data, and the color green is assigned. A signal line with the connection number 4 corresponds to GND used as a common ground, and the color black is assigned. Further, a case (shell) is provided to shield the above signal lines.

The interface 104 is formed by, for example, the USB port described above. Data and electric power are input and output between the wireless communication device 10 and the host device 30 via the interface 104.

Further, the transmission data buffer 111 temporarily stores application data that is supplied from the host device 30 via the interface 104.

The wireless transmission portion 112 modulates the application data stored in the transmission data buffer 111, control data supplied from the protocol control portion 116, and the like to high frequency signals, which are then transmitted from the antenna 106 as wireless signals. The wireless receiving portion 114 decodes the wireless signals received by the antenna 106. In this manner, the wireless receiving portion 114 and the wireless transmission portion 112 function as a wireless communication portion.

The received data buffer 115 temporarily stores the application data decoded by the wireless receiving portion 114.

The protocol control portion 116 controls wireless communication between the wireless communication device 10 and the wireless communication device 20 in accordance with a predetermined protocol. For example, the protocol control portion 116 performs management of the transmission timing of a wireless signal transmitted by the wireless transmission portion 112, management of the reception timing of a wireless signal received by the wireless receiving portion 114, management of a super frame cycle, beacon generation, and the like. Hereinafter, communication protocols, the super frame cycle, and beacons will be described with reference to FIG. 8 to FIG. 14.

Figure 8:
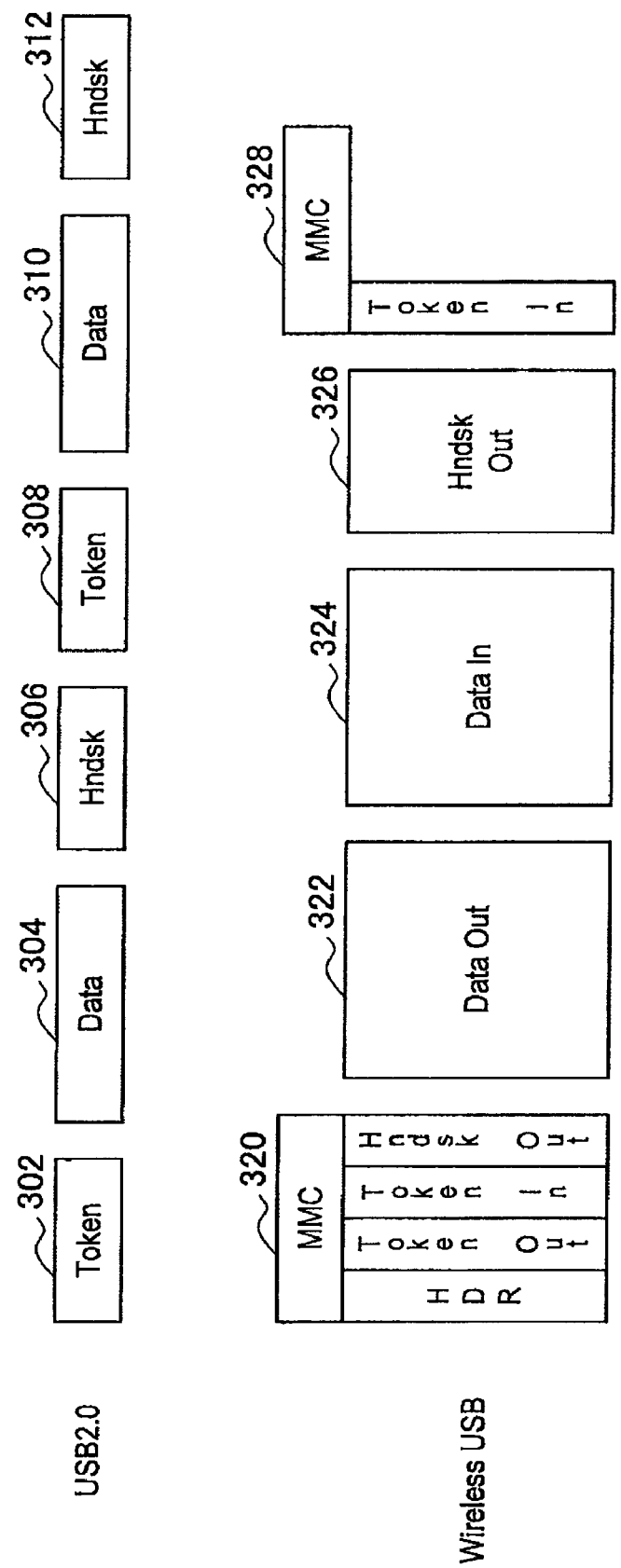
FIG. 8 is an explanatory diagram showing communication protocols used by USBs.

FIG. 8 is an explanatory diagram showing communication protocols used by USBs. More specifically, a communication protocol used by a wired USB defined by the USB 2.0 specification is shown in the upper section of FIG. 8, and a communication protocol used by a wireless USB is shown in the lower section of FIG. 8.

As shown in the upper section of FIG. 8, in the wired USB, first, a USB host transmits a token 302, and a data 304 specified by the token 302 is transmitted, for example, from the USB host to a USB device. Then, a handshake (Hndsk) 306 for notifying whether or not the data 304 has been received is returned, for example, from the USB device to the USB host as reception confirmation.

After that, the USB host transmits a token 308, and a data 310 specified by the token 308 is transmitted, for example, from the USB device to the USB host. Then, a handshake (Hndsk) 312 for notifying whether or not the data 310 has been received is returned, for example, from the USB host to the USB device as reception confirmation.

As shown in the lower section of FIG. 8, in the wireless USB, first, an MMC 320, which is a command, is transmitted from a host-side device to a wireless transmission path. Then, a downlink token (Token Out), an uplink token (Token In), and a downlink handshake (Hndsk Out) are specified in accordance with a time slot described in the MMC 320.

After that, at the time specified by each of the above tokens, a downlink data (Data Out) 322, an uplink data (Data In) 324, and a downlink handshake (Hndsk Out) 326 are transmitted. Note that, whether or not the downlink handshake 326 has been successfully transmitted is determined by a sequence number of an uplink token (Token In) in a following MMC 328.

Figure 9:
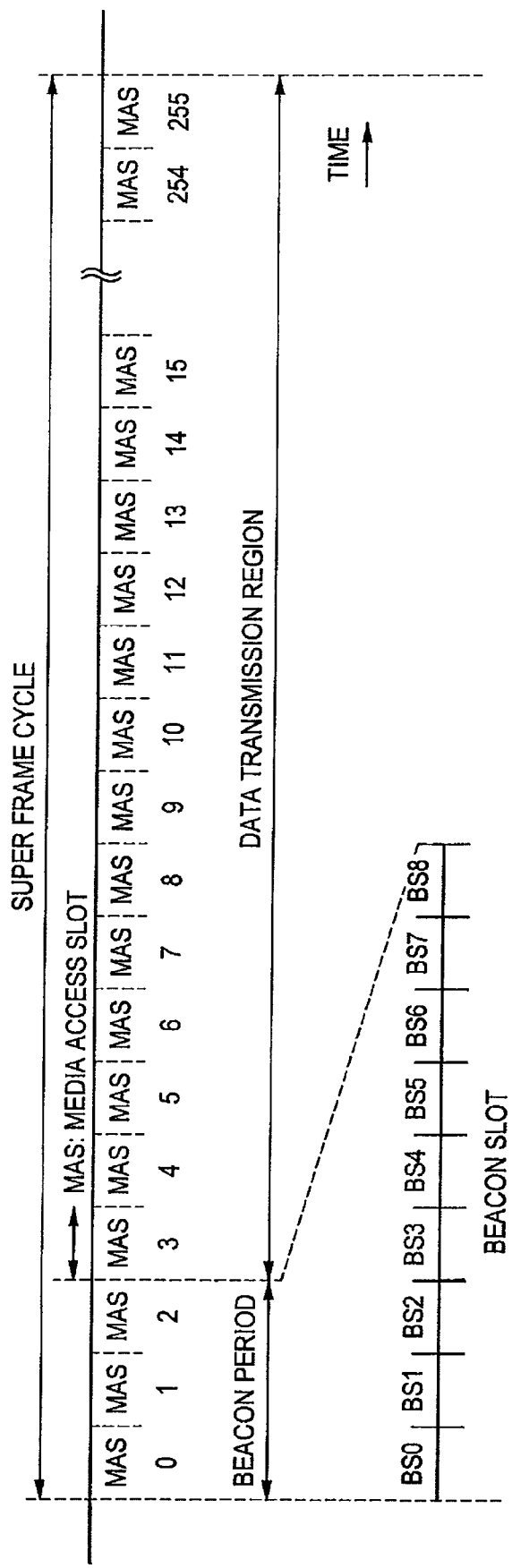
FIG. 9 is an explanatory diagram showing an example of the structure of a super frame.

FIG. 9 is an explanatory diagram showing an example of the structure of a super frame. The super frame cycle is defined by a predetermined time (for example, approximately 65,536 µs), and is divided into 256 media access slots (MAS) (hereinafter also simply referred to as a slot). The wireless communication device 10 shares the super frame cycle as a specified period frame, and the divided slots are used as units to transfer messages.

In addition, there is a beacon period (BP) that serves as a management domain for transmitting and receiving management information using a beacon (a beacon signal) at the head of the super frame, and beacon slots (BS) are arranged at specified intervals. The wireless communication device 10 is set with a specified beacon slot, and exchanges parameters for performing network management or access control with the wireless communication device 20 in the vicinity. FIG. 9 shows an example in which 9 beacon slots are set, namely, BS0 to BS8, as the beacon period. Note that, the period that is not set as the beacon period is normally used as a data transmission region. The wireless communication device 10 operates while sharing the slots with another wireless communication system.

Figure 10:
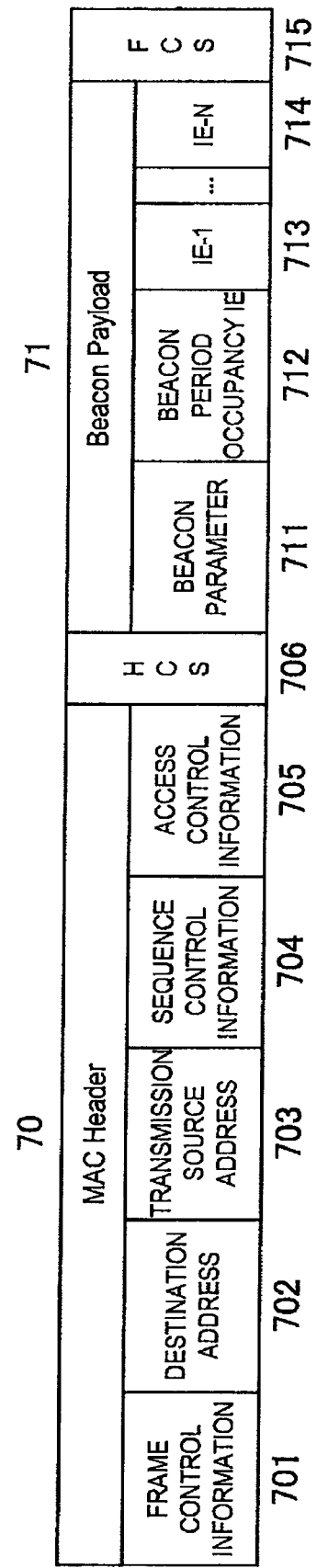
FIG. 10 is an explanatory diagram showing an example of the structure of a beacon frame.

FIG. 10 is an explanatory diagram showing an example of the structure of a beacon frame. As shown in FIG. 10, the beacon includes a MAC header 70, a header check sequence (HCS) 706, a beacon payload 71, and a frame check sequence (FCS) 715.

As shown in FIG. 10, the MAC header 70 includes a frame control information 701, a destination address 702 for identifying a wireless communication device on the receiving side, a transmission source address 703 for identifying a wireless communication device on the transmitting side, a sequence control information 704 such as a sequence number, and an access control information 705 in which a parameter necessary for access control is described.

The beacon payload 71 includes a beacon parameter 711, a beacon period occupancy information element 712, a first information element 713, and an N-th information element 714. Note that, "N" indicates the number of information elements that are transmitted by being attached to each beacon. "N" may take a different value for each beacon transmitted. Each information element may be added or deleted as necessary to structure a beacon frame. For example, the beacon may include one of information elements relating to power transmission that are shown in FIG. 11 to FIG. 14.

FIG. 11 is an explanatory diagram showing an example of the structure of a power transmission information element (Power Transmission IE). The power transmission information element indicates the content of the power transmission that can be transmitted from the device itself. The power transmission information element is generated by the protocol control portion 116 when the device itself notifies in advance the wireless communication device 20 in the vicinity of the content of the power transmission that can be transmitted from the device itself.

As shown in FIG. 11, the power transmission information element includes an element identifier 721 that indicates that the information element is the power transmission information element, and an information length 722 that indicates the length of the element. Further, the power transmission information element includes a usable power transmission format 723 that indicates a transmission format that can be used when transmitting power, and a usable power reception format 724 that indicates a transmission format that can be used when receiving the transmitted power. Specific examples of the transmission format will be described later in "3. Practical examples of power exchange".

Further, the power transmission information element includes a maximum transmittable power amount 725 that indicates an amount of power that can be transmitted when transmitting power, and a maximum receivable power amount 726 that indicates an amount of power that can be received when receiving the transmitted power. When the wireless communication device 20 receives the above-described power transmission information element, it can confirm in advance the content of the power transmission that can be performed by the wireless communication device 10.

FIG. 12 is an explanatory diagram showing an example of the structure of a power transmission request information element (Power Transmission Request IE). The power transmission request information element is an information element that is generated by the protocol control portion 116 in order to request the wireless communication device 20 to transmit power when the power exchange control portion 124 determines that power supply from the outside is necessary. The power transmission request information element is also an information element that is transmitted from the wireless communication device 20 when it is determined in the wireless communication device 20 that power supply from the outside is necessary.

As shown in FIG. 12, the power transmission request information element includes an element identifier 731 that indicates that the information element is the power transmission request information element, and an information length 732 that indicates the length of the element. Further, the power transmission request information element includes a power transmission source address 733 that specifies the wireless communication device that transmits power, a power reception format 734 that specifies the format used when the device itself receives the transmitted power, and a desired power reception amount 735 that indicates an amount of power that the device itself desires to receive. Further the power transmission request information element includes a power reception time slot 736 that indicates a time slot during which the device itself desires to receive power. The power reception time slot 736 may indicate one or more given slots in the super frame.

FIG. 13 is an explanatory diagram showing an example of the structure of a power transmission response information element (Power Transmission Response IE). The power transmission response information element is an information element that is generated by the protocol control portion 116 in order to respond to the power transmission request information element when the wireless communication device 10 has received the power transmission request information element from the wireless communication device 20. The power transmission response information element is also an information element that is generated by the wireless communication device 20 in order to respond to the power transmission request information element when the wireless communication device 20 has received the power transmission request information element from the wireless communication device 10.

As shown in FIG. 13, the power transmission response information element includes an element identifier 741 that indicates that the information element is the power transmission response information element, and an information length 742 that indicates the length of the element. Further, the power transmission response information element includes a power transmission destination address 743 that specifies the device to which power is transmitted, and a power transmission format 744 that indicates the format used when the device itself transmits power, and an agreed power transmission amount 745 that indicates an amount of power that the device itself has agreed to transmit. Further, the power transmission response information element includes a power transmission time slot 746 that indicates a time slot during which the device itself has agreed to transmit power.

FIG. 14 is an explanatory diagram showing an example of the structure of a power transmission termination information element (Power Transmission Termination IE). The power transmission termination information element is an information element that is generated, when termination of power supply is requested, by the protocol control portion 116 of the wireless communication device 10 to which power has been supplied from the wireless communication device 20. The power transmission termination information element is also an information element that is generated, when termination of power supply is requested, by the wireless communication device 20 to which power has been supplied from the wireless communication device 10.

As shown in FIG. 14, the power transmission termination information element includes an element identifier 751 that indicates that the information element is the power transmission termination information element, and an information length 752 that indicates the length of the element. Further, the power transmission termination information element includes a power transmission source address 753 that indicates the device that transmits power.

The protocol control portion 116 generates the above-described information elements relating to power transmission according to need, and the wireless transmission portion 112 transmits the generated information elements to the wireless communication device 20. As a result, it is possible to start or terminate power transmission between the wireless communication device 10 and the wireless communication device 20.

The drive power source management portion 122 detects the power source state of the host device 30, and functions as a power management portion that manages input and output of power between the wireless communication device 10 and the host device 30. The power source state of the host device 30 can be determined, for example, by whether or not the host device 30 is connected to a power source that constantly supplies power, such as an AC power source, or by a remaining capacity of a battery when the host device 30 operates on the battery. Further, when the secondary battery 130 is provided in the wireless communication device 10, the drive power source management portion 122 manages the input and output of power to and from the secondary battery 130.

For example, when power is transmitted from the wireless communication device 10 to the wireless communication device 20, the drive power source management portion 122 causes the power to be input from the host device 30 to the interface 104. When the wireless communication device 10 receives power from the wireless communication device 20, the drive power source management portion 122 causes the received power to be output from the interface 104 to the host device 30.

The power exchange portion 128 transmits power to the wireless communication device 20, and receives power transmitted from the wireless communication device 20. The power transmission portion 125 performs an operation that is necessary to cause the power exchange portion 128 to transmit power, based on control by the power exchange control portion 124. The power receiving portion 126 performs an operation that is necessary for the power exchange portion 128 to receive power, based on control by the power exchange control portion 124.

The power exchange control portion 124 functions as a power control portion that controls whether or not to cause the power exchange portion 128 to exchange power with the wireless communication device 20, depending on the power source state of the host device 30. Hereinafter, a case in which the power exchange control portion 124 determines that it is necessary to request the wireless communication device 20 to transmit power, and a case in which the power exchange control portion 124 responds to the power transmission request from the wireless communication device 20 will be described as an example.

Request for Power Transmission (Example 1) When the host device 30 is connected to a power source (a constant power source) that can constantly supply electric power, the power exchange control portion 124 determines that the request for power transmission is not necessary.

(Example 2) When the host device 30 is not connected to a constant power source and the device 40 is connected to a constant power source, the power exchange control portion 124 determines that the request for power transmission will be performed. Note that information relating to the power source state may be included in the power transmission information element.

(Example 3) When the host device 30 is not connected to a constant power source but is connected to a secondary battery, and a remaining capacity of the secondary battery is smaller than a predetermined reference value, the power exchange control portion 124 determines that the request for power transmission will be performed. Note that the predetermined reference value may be an absolute remaining amount of electric power, or may be an amount of electric power that enables the wireless communication device 10 and the host device 30 to operate for a predetermined period of time.

(Example 4) When drawing of power from the interface 104 to the host device 30 (for example, VBUS) is detected, the power exchange control portion 124 determines that the power transmission will be performed.

Response to Power Transmission Request (Example 1) When a format that is not compatible with the device itself is described in the power reception format 734 of the power transmission request information element, the power exchange control portion 124 determines that power transmission to the wireless communication device 20 will not be performed. On the other hand, when a format that is compatible with the device itself is described in the power reception format 734 of the power transmission request information element, the power exchange control portion 124 determines that power transmission will be performed using the format.

(Example 2) When an amount of electric power that exceeds a maximum possible power transmission amount of the device itself is described in the desired power reception amount 735 of the power transmission request information element, the power exchange control portion 124 determines that power transmission to the wireless communication device 20 will not be performed. Alternatively, the power exchange control portion 124 determines that power transmission will be performed at the maximum possible power transmission amount. The protocol control portion 116 generates the power transmission response information element corresponding to the result of the determination by the power exchange control portion 124.

(Example 3) When the host device 30 is connected to a constant power source, the power exchange control portion 124 determines that power transmission to the wireless communication device 20 will be performed.

(Example 4) When the host device 30 is not connected to a constant power source, but is connected to a secondary battery, and a remaining capacity of the secondary battery is less than a lower limit value, the power exchange control portion 124 determines that the request for power transmission will not be performed. Note that the lower limit value may be an absolute remaining amount of electric power, or may be an amount of electric power that enables the wireless communication device 10, the host device 30 and the device 40 to operate for a predetermined period of time.

(Example 5) When the host device 30 is connected to a secondary battery, the device 40 is also connected to a secondary battery, and a remaining capacity of the secondary battery of the host device 30 is smaller than a remaining capacity of the secondary battery of the device 40, the power exchange control portion 124 determines that the power transmission will not be performed.

The power exchange portion 124 may perform control such that power exchange is performed when the host device 30 and the device 40 are mutually authenticated. With this configuration, the wireless communication device 10 can selectively transmit power to the wireless communication device 20 on the authenticated device 40 side In addition, when the power exchange control portion 124 determines that power exchange will be performed in response to the power transmission request, the protocol control portion 116 selects a part or whole of the time slot described in the power reception time slot 736 of the power transmission request information element. Then, the protocol control portion 116 generates the power transmission response information element that includes the power transmission time slot 746 in which the selected time slot is described, and transmits it. As a result, the wireless communication device 20 shifts to a state for receiving electric power during the time slot described in the power transmission time slot 746, and the wireless communication device 10 performs power transmission during the time slot described in the power transmission time slot 746.

In this manner, the wireless communication device 10 specifies the time slot for transmitting power using the power transmission time slot 746. Thus, a plurality of wireless communication devices can receive power from the wireless communication device 10 in a time sharing manner. For example, if a wireless communication device connected to an imaging device receives power from the wireless communication device 10 during a period of the super frame cycle, a wireless communication device connected to a music playback device can receive power from the wireless communication device 10 during another period of the super frame cycle.

Next, the configuration of the wireless communication device 20 on the device 40 side will be described with reference to FIG. 15.

Figure 15:
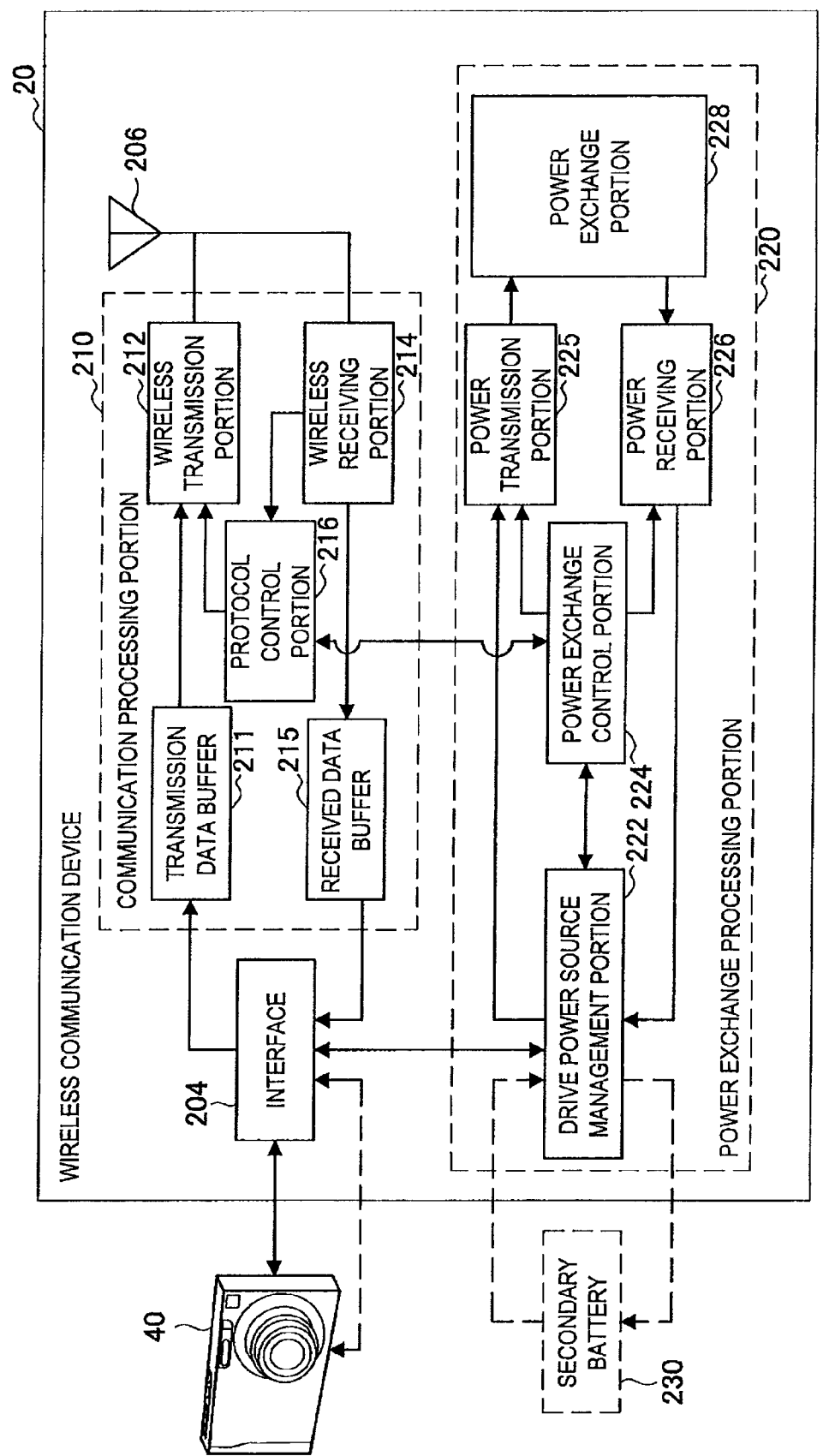
FIG. 15 is a functional block diagram showing the configuration of a wireless communication device connected to a device.

FIG. 15 is a functional block diagram showing the configuration of the wireless communication device 20 connected to the device 40. As shown in FIG. 15, the wireless communication device 20 includes an interface 204, an antenna 206, a communication processing portion 210, a power exchange processing portion 220, and a secondary battery 230. Further, the communication processing portion 210 includes a transmission data buffer 211, a wireless transmission portion 212, a wireless receiving portion 214, a received data buffer 215, and a protocol control portion 216. Further, the power exchange processing portion 220 includes a drive power source management portion 222, a power exchange control portion 224, a power transmission portion 225, a power receiving portion 226, and a power exchange portion 228.

The configurations of the interface 204, the antenna 206, and the communication processing portion 210 are substantially the same as the configurations of the interface 104, the antenna 106, and the communication processing portion 110 of the wireless communication device 10. Accordingly, the power exchange control portion 224 of the power exchange processing portion 220 will be described below.

The power exchange control portion 224 functions as a power control portion that controls whether or not to cause the power exchange portion 228 to exchange power with the wireless communication device 10, depending on the power source state of the device 40. Hereinafter, a case in which the power exchange control portion 224 determines that it is necessary to request the wireless communication device 10 to transmit power, and a case in which the power exchange control portion 224 responds to the power transmission request from the wireless communication device 10 will be described as an example.

Request for Power Transmission (Example 1) When the device 40 is connected to a constant power source, the power exchange control portion 224 determines that the request for power transmission is not necessary.

(Example 2) When the device 40 is not connected to a constant power source and the host device 30 is connected to a constant power source, the power exchange control portion 224 determines that the request for power transmission will be performed. Note that information relating to the power source state may be included in the power transmission information element.

(Example 3) When the device 40 is not connected to a constant power source but is connected to a secondary battery, and a remaining capacity of the secondary battery is smaller than a predetermined reference value, the power exchange control portion 224 determines that the request for power transmission will be performed. Note that the predetermined reference value may be an absolute remaining amount of electric power, or may be an amount of electric power that enables the wireless communication device 10 and the host device 30 to operate for a predetermined period of time.

(Example 4) When drawing of power from the interface 204 to the device 40 (for example, VBUS) is detected, the power exchange control portion 224 determines that the request for power transmission will be performed.

Response to Power Transmission Request (Example 1) When a format that is not compatible with the device itself is described in the power reception format 734 of the power transmission request information element, the power exchange control portion 224 determines that power transmission to the wireless communication device 10 will not be performed.

(Example 2) When an amount of electric power that exceeds a maximum possible power transmission amount of the device itself is described in the desired power reception amount 735 of the power transmission request information element, the power exchange control portion 224 determines that power transmission to the wireless communication device 10 will not be performed. Alternatively, the power exchange control portion 224 determines that power transmission will be performed at the maximum possible power transmission amount. The protocol control portion 116 generates the power transmission response information element corresponding to the result of the determination by the power exchange control portion 224.

(Example 3) When the device 40 is connected to a constant power source, the power exchange control portion 224 determines that power transmission to the wireless communication device 10 will be performed.

(Example 4) When the device 40 is not connected to a constant power source, but is connected to a secondary battery, and a remaining capacity of the secondary battery is less than a lower limit value, the power exchange control portion 224 determines that the power transmission will not be performed. Note that the lower limit value may be an absolute remaining amount of electric power, or may be an amount of electric power that enables the wireless communication device 20, the device 40 and the host device 30 to operate for a predetermined period of time.

(Example 5) When the device 40 is connected to a secondary battery, the host device 30 is also connected to a secondary battery, and a remaining capacity of the secondary battery of the device 40 is smaller than a remaining capacity of the secondary battery of the host device 30, the power exchange control portion 224 determines that the power transmission will not be performed.

3. PRACTICAL EXAMPLES OF POWER EXCHANGE

The configurations of the wireless communication device 10 and the wireless communication device 20 have been described above. The power exchange portion 128 included in the wireless communication device 10 and the power exchange portion 228 included in the wireless communication device 20 operate in accordance with a given principle of operation, for example, an electromagnetic induction system, a radio wave receiving system, a magnetic field resonance system, and an electric field resonance system. The configurations of the power exchange portion 128 and the power exchange portion 228 that operate in accordance with each principle of operation will be specifically described with reference to FIG. 16A to FIG. 16D.

Figure 16A:
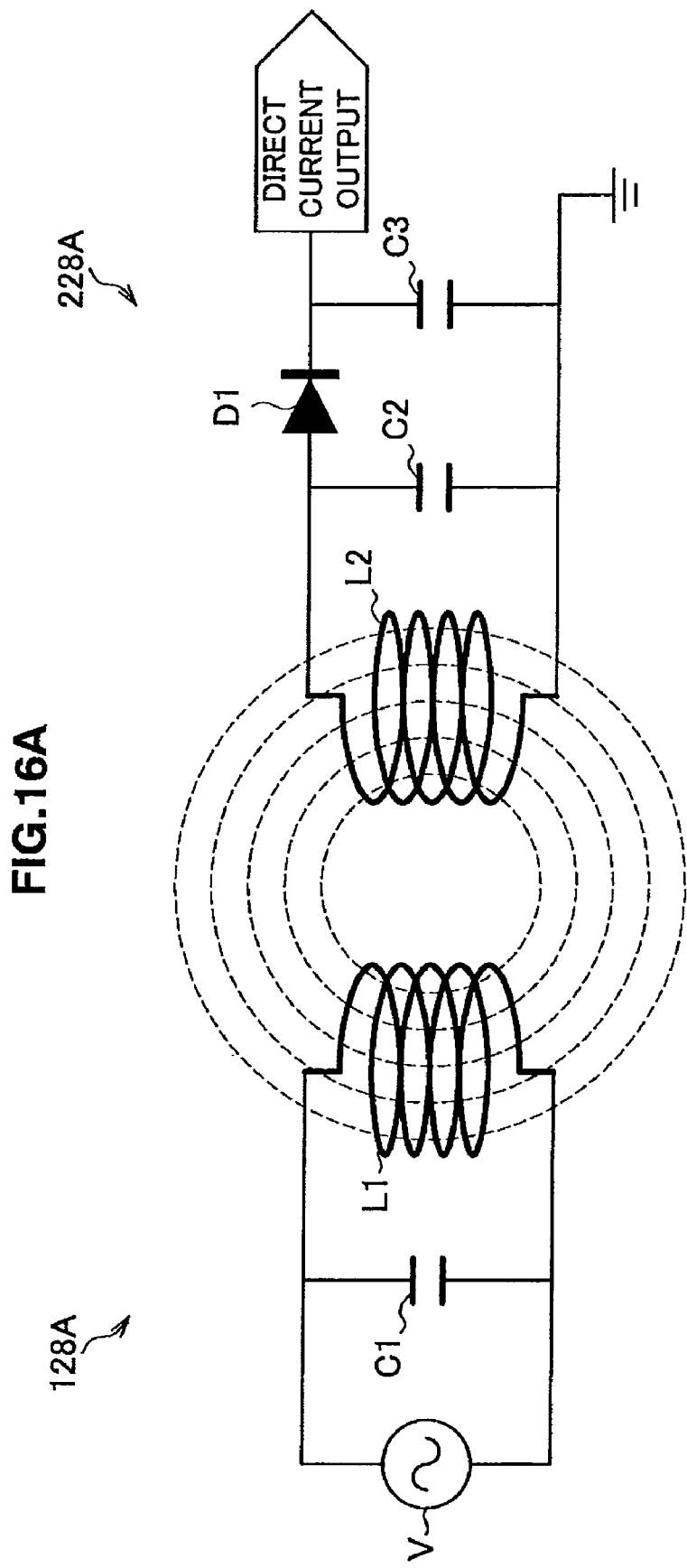
FIG. 16A is an explanatory diagram showing the configuration of power exchange portions that operate in an electromagnetic induction system.

FIG. 16A is an explanatory diagram showing the configuration of a power exchange portion 128A and a power exchange portion 228A that operate in an electromagnetic induction system. As shown in FIG. 16A, the power exchange portion 128A that operates in the electromagnetic induction system includes an alternating current source V, a capacitor C1, and an inductor L1. The power exchange portion 228A includes an inductor L2, a capacitor C2, a capacitor C3, and a diode D1. With this configuration, when an alternating current is output from the alternating current source V, the alternating current flows to the inductor L1, and a magnetic flux is generated around the inductor L1. This magnetic flux causes the alternating current to flow to the inductor L2, and the diode D1 and the capacitor C3 rectify the alternating current. Thus, the power exchange portion 228A can obtain a direct current.

It is known that, if metal exists in a range of the magnetic flux that is generated during power transmission using the electromagnetic induction system, the metal is heated. Accordingly, in order to safely transmit power using the electromagnetic induction system, the power exchange portion 228A on the power receiving side and the power exchange portion 128A on the power transmission side need to be located in proximity (for example, within a few centimeters). Note that, in the electromagnetic induction system, the transmission efficiency of electric power varies depending on the winding manner and the positional arrangement of the inductor L1 and the inductor L2. Therefore, transmission efficiency can be optimized by accurately detecting the positional relationship between the power receiving side and the power transmission side.

Figure 16B:
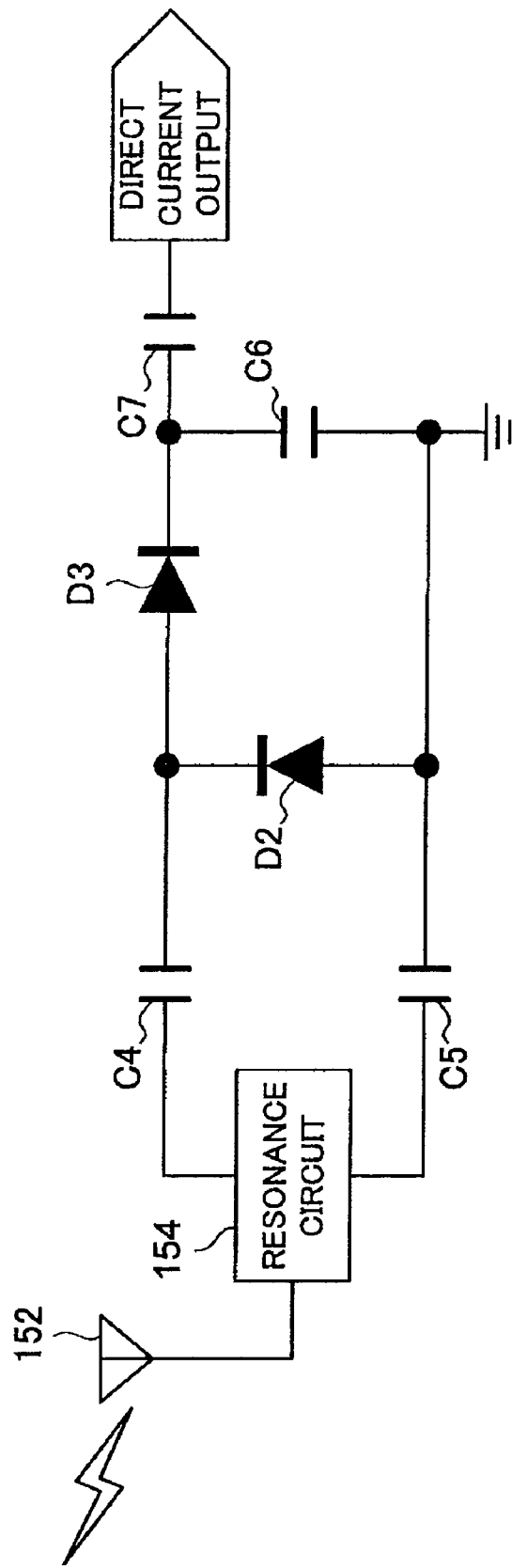
FIG. 16B is an explanatory diagram showing the configuration of a power exchange portion that operates in a radio wave receiving system.

FIG. 16B is an explanatory diagram showing the configuration of a power exchange portion 128B that operates in a radio wave receiving system. As shown in FIG. 16B, the power exchange portion 128B that operates in the radio wave receiving system includes an antenna 152, a resonance circuit 154, a capacitor C4, a capacitor C5, a diode D2, a diode D3, a capacitor C6, and a capacitor C7. With this configuration, when a radio wave is received by the antenna 152, an alternating current is supplied from the antenna 152 to the resonance circuit 154, and the resonance circuit 154 amplifies the alternating current by resonance. Further, a rectifying circuit formed of the diode D3, the capacitor C6 and the like rectifies the amplified alternating current. Thus, direct current components are extracted, and the power exchange portion 128B can obtain a direct current.

The radio wave receiving system is a method for obtaining electric power from the radio wave received from the surroundings in this manner. Therefore, when the received radio wave is weak, it is difficult to obtain enough electric power. Therefore, the radio wave receiving system is mainly used to transmit power to a device that consumes relatively small power, such as a mouse. Further, in the radio wave receiving system, the power exchange portion 128B can accumulate electric power in the secondary battery 130 by receiving radio waves for a long time, and the electric power accumulated in the secondary battery can be used for communication.

FIG. 16C is an explanatory diagram showing the configuration of a power exchange portion 128C and a power exchange portion 228C that operate in a magnetic field resonance system. As shown in FIG. 16C, the power exchange portion 128C that operates in the magnetic field resonance system includes a capacitor C8 and an inductor L3. The power exchange portion 228C includes a capacitor C9 and an inductor L4.

FIG. 16D is an explanatory diagram showing the configuration of a power exchange portion 128D and a power exchange portion 228D that operate in an electric field resonance system. As shown in FIG. 16D, the power exchange portions 128D and 228D that operate in the electric field resonance system are formed by a dielectric material.

The above-described magnetic field resonance system and electric field resonance system are methods that utilize the principal of resonance, i.e., when two transducers having a specific vibration frequency are aligned, vibration applied to one transducer is transmitted to the other transducer. Because the magnetic field resonance system and the electric field resonance system configured as described above have high transmission efficiency, they can transmit a few kilowatts of power at a few meters of distance. However, an antenna having a size proportional to a transmission distance is required. Accordingly, it is considered that application to a general-purpose system is difficult.

4. OPERATION OF POWER EXCHANGE SYSTEM ACCORDING TO THE PRESENT EMBODIMENT

Next, the operation of a power exchange system 1 according to the present embodiment will be described with reference to FIG. 17.

FIG. 17 is a sequence diagram showing the flow of the operation of the power exchange system 1 according to the present embodiment. As shown in FIG. 17, first, the host device 30 connected to the wireless communication device 10 sends network control information to the communication processing portion 110 (step S402). Then, based on the network control information, the communication processing portion 110 transmits a beacon, and an MMC command defined by the wireless USB (step S404). After that, the wireless communication device 20 transmits the network control information to the device 40 connected thereto, based on the beacon and the MMC command received from the wireless communication device 10 (step S406).

When the device 40 connected to the wireless communication device 20 performs a predetermined authentication with the host device 30, the device 40 sends a device authentication request to the communication processing portion 210 (step S408). Then, the communication processing portion 210 transmits DN Connect, which is a predetermined command, in accordance with the timing specified by the MMC command (step S410). After that, the wireless communication device 10 transmits the DN Connect received from the wireless communication device 20 to the host device 30 as the device authentication request (step S412).

Then, the host device 30 determines whether or not to accept the authentication request from the device 40 (step S414). When the device 40 is authenticated, the host device 30 transmits device authentication information to the communication processing portion 110 (step S416). The communication processing portion 110 transmits the device authentication information as Connect ACK, which is a predetermined command (step S418). Then, the communication processing portion 210 of the wireless communication device 20 transmits the device authentication information to the device 40 (step S420), and the device 40 registers the device authentication information (step S422).

After that, when the power receiving portion 226 of the wireless communication device 20 detects drawing of power from the device 40 at a VBUS terminal (step S424), the power exchange control portion 224 requests the communication processing portion 210 to supply power (step S426). Then, the communication processing portion 210 transmits a beacon, in which the power transmission request information element (Power Transmission Request IE) is set, to the wireless communication device 10 connected to the host device 30 (step S428).

When the communication processing portion 110 of the wireless communication device 10 receives the beacon in which the power transmission request information element is set, it notifies the power exchange processing portion 120 of the content of the power transmission request information element (step S430). After that, the power exchange processing portion 120 determines whether or not to perform power transmission, based on the power source state of the host device 30 and the authentication state with the device 40 connected to the wireless communication device 20 (step S434). When the power exchange processing portion 120 determines that power transmission will be performed, it draws power from the host device 30 via the VBUS of the interface 104 (step S436).

Further, the power exchange portion 120 sends notification that power drawing has been started or that power transmission will be performed, to the communication processing portion 110 (step S438). When the communication processing portion 110 receives the notification, it transmits a beacon in which the power transmission response information element (Power Transmission Response IE) is set (step S440). When the communication portion 210 of the wireless communication device 20 receives the beacon in which the power transmission response information element is set, it notifies the power exchange processing portion 220 of the content of the power transmission response information element (step S442). Then, the power exchange processing portion 220 performs setting for power reception, in accordance with the content of the power transmission response information element (step S444). Meanwhile, the power exchange processing portion 120 of the wireless communication device 10 performs setting for power transmission, in accordance with the content of the transmitted power transmission response information element (step S445).

After that, the power exchange processing portion 120 of the wireless communication device 10 transmits power drawn from the host device 30 to the wireless communication device 20, and the power exchange processing portion 220 of the wireless communication device 20 outputs the received power to the device 40 via the VBUS (steps S446 and S454).

Further, a predetermined communication protocol is also transmitted, if necessary, along with the power transmission. For example, when the network control information is transmitted from the host device 30 to the communication processing portion 110 (step S448), the communication processing portion 110 transmits a beacon and the MMC command defined by the wireless USB, based on the network control information (step S450). Then, the wireless communication device 20 outputs the network control information to the device 40 based on the received beacon and MMC command.

After that, when the power exchange processing portion 220 of the wireless communication device 20 detects that drawing of power from the device 40 via the VBUS is terminated, it notifies the communication processing portion 210 of the termination of power supply (step S456). In response to this, the communication processing portion 210 transmits a beacon, in which the power transmission termination information element (Power Transmission Termination IE) is set, to the wireless communication device 10 (step S458). When the communication processing portion 110 of the wireless communication device 10 receives the beacon in which the power transmission termination information element is set, it notifies the power exchange processing portion 120 of the content of the power transmission termination information element (step S460).

When the power exchange processing portion 120 is notified of the content of the power transmission termination information element, it clears the setting for power transmission, and stops the drawing of power from the VBUS terminal. The power exchange processing portion 120 also terminates power transmission to the device 40 connected to the wireless communication device 20.

5. OPERATION OF HOST-SIDE WIRELESS COMMUNICATION DEVICE

Next, the operation of the wireless communication device 10 connected to the host device 30 will be described with reference to FIG. 18.

Figure 18:
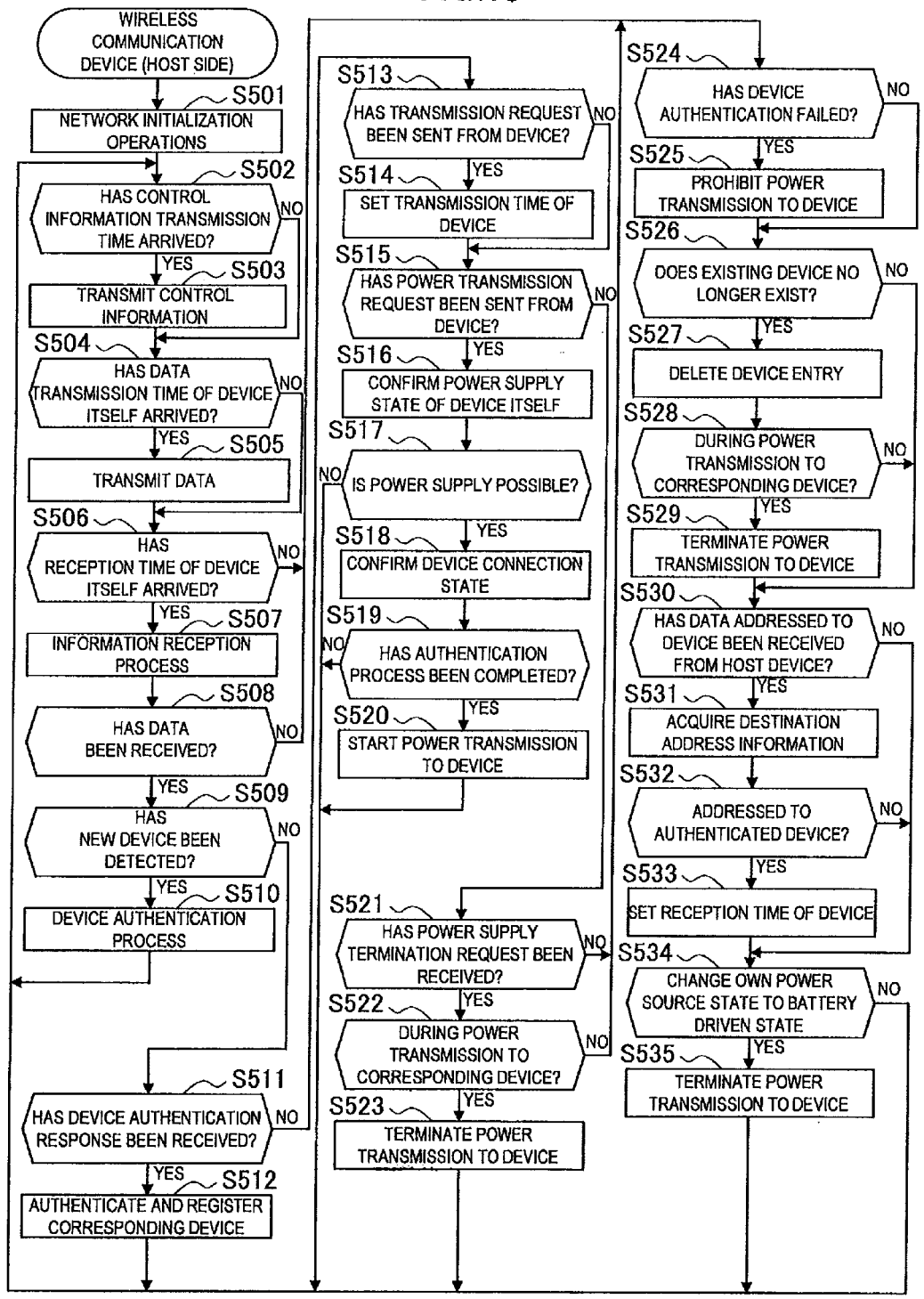
FIG. 18 is a flowchart showing the flow of the operation of the wireless communication device connected to the host device.

FIG. 18 is a flowchart showing the flow of the operation of the wireless communication device 10 connected to the host device 30. As shown in FIG. 18, the wireless communication device 10 first performs network initialization operations, such as beacon period setting, setting for beacon transmission/reception processing, and the like, in accordance with instructions from the host device 30 connected to the wireless communication device 10 (step S501). When the transmission time for control information such as a beacon has arrived (step S502), the wireless communication device 10 transmits the control information (step S503). When the data transmission time of the device itself has arrived (step S504), the wireless communication device 10 transmits the data (step S505).

Further, during a beacon period, or when the reception time of the device itself for receiving data from a device has arrived (step S506), the wireless communication device 10 receives data sent during the time period (step S507). If the wireless communication device 10 has received data (step S508), and the data is an authentication request (DN Connect) from a new device (step S509), the wireless communication device 10 performs a device authentication process according to the request, and exchanges authentication information (step S510). When a response to the authentication has been received from the device (step S511), the wireless communication device 10 registers the fact that an authenticated relationship has been established with the corresponding device (step S512). Note that, here, the term "device" is used as a concept that includes the device 40 and the wireless communication device 20 connected to the device 40.

Further, when a data transmission request has been sent from the device (step S513), the wireless communication device 10 assigns the transmission time for the device, and sets the transmission time in the MMC command (step S514). Further, when a power transmission request has been sent from the device (step S515), the wireless communication device 10 confirms the power source states of the device itself and the host device 30 (step S516), and determines whether or not power transmission is possible at this timing (step S517). When the wireless communication device 10 determines that power transmission is possible, it confirms the connection state between the device that has sent the request and the wireless communication device 10 (step S518). When the authentication process with the device that has sent the request has already been completed (step S519), the wireless communication device 10 starts to transmit power to the device (step S520).

When a power transmission termination request has been sent from the device (step S521) during power transmission to the corresponding device (step S522), the wireless communication device 10 terminates the power transmission to the device (step S523). On the other hand, when a data reception waiting state continues and no data is received for a certain period of time during the device authentication process, it means that the device authentication process has failed (step S524). Therefore, the wireless communication device 10 prohibits power transmission to the device (step S525).

When an existing device no longer exists (step S526), the wireless communication device 10 deletes the registration relating to the authentication of the device (step S527). In this case, if power is being transmitted to the corresponding device (step S528), the wireless communication device 10 terminates power transmission to the device (step S529).

When the wireless communication device 10 has received data addressed to a device from the host device 30 connected via the interface 104 (step S530), it acquires destination address information in the data (step S531). If the data is addressed to an authenticated device (step S532), the wireless communication device 10 assigns the reception time for the device, and sets the reception time in the MMC command (step S533).

When, for example, power is no longer drawn from the host device 30 via the VBUS and the power source state of the wireless communication device 10 is changed to a battery driven state (step S534), the wireless communication device 10 may terminate power transmission to the device if necessary (step S535). Then, the wireless communication device 10 returns to the process at step S502 again, and repeats a series of processes.

6. OPERATION OF DEVICE-SIDE WIRELESS COMMUNICATION DEVICE

Next, the operation of the wireless communication device 20 connected to the device 40 will be described with reference to FIG. 19.

Figure 19:
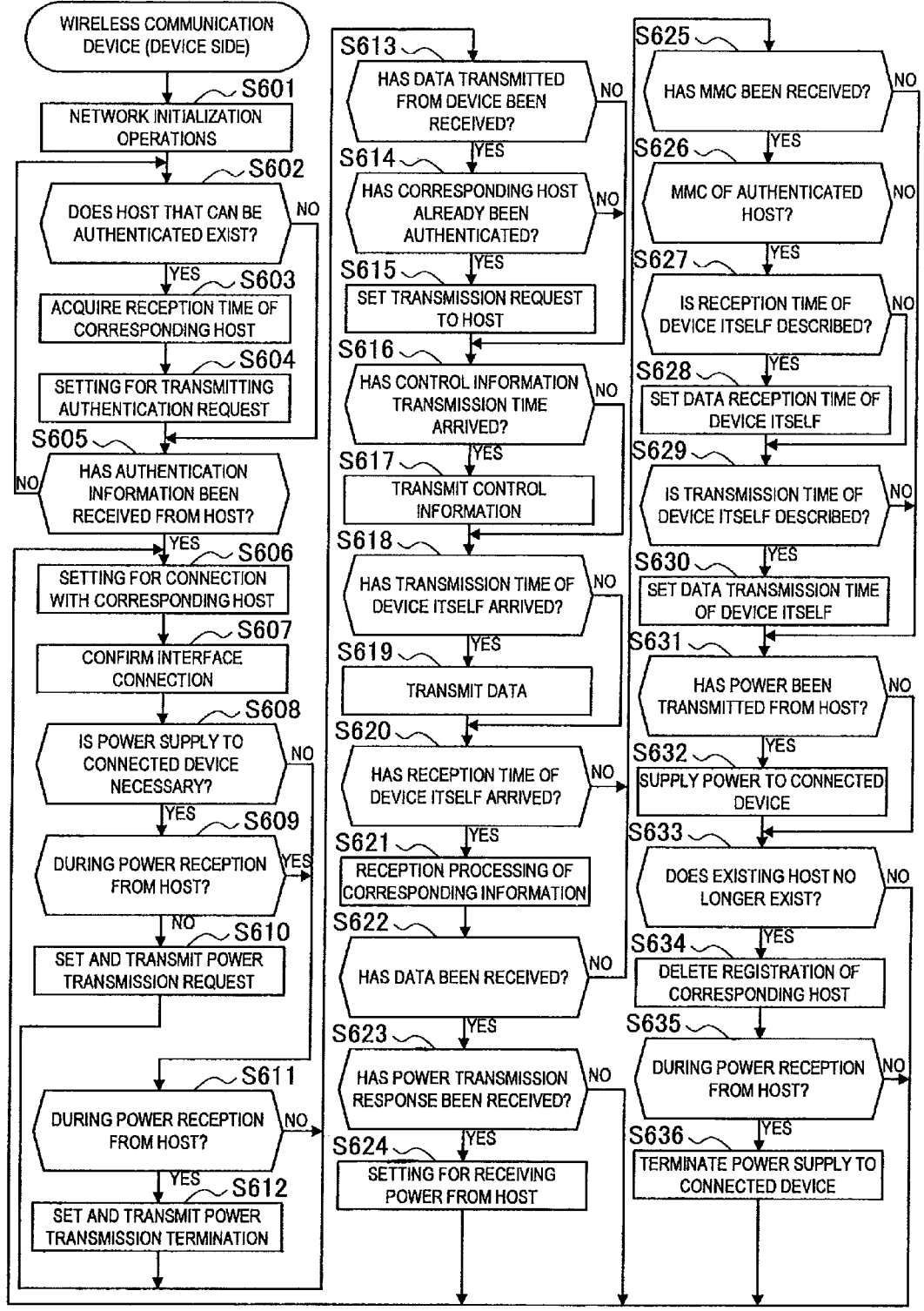
FIG. 19 is a flowchart showing the flow of the operation of the wireless communication device connected to the device.

FIG. 19 is a flowchart showing the flow of the operation of the wireless communication device 20 connected to the device 40. As shown in FIG. 19, the wireless communication device 20 first performs network initialization operations, such as beacon period setting, setting for beacon transmission/reception processing, and the like (step S601).

Next, the wireless communication device 20 collects the MMC commands from hosts existing in the vicinity. If a host that can be authenticated by the device 40 connected to the wireless communication device 20 exists in the vicinity (step S602), the wireless communication device 20 acquires a notification reception time of the host (step S603). Then, the wireless communication device 20 performs setting for transmitting the authentication request (DN Connect) at the notification reception time of the host (step S604). Note that the term "host" is used as a concept that includes the host device 30 and the wireless communication device 10 connected to the host device 30.

When the wireless communication device 20 has received authentication information from the host (step S605), it means that an authentication process with the host has succeeded. Therefore, the wireless communication device 20 performs connection setting (step S606). Note that, when the wireless communication device 20 has failed to receive the authentication information from the host, the process returns to step S602. At step S602, the wireless communication device 20 searches for another host that can be authenticated, and transmits the authentication request again.

The wireless communication device 20 confirms the connection state at the interface 204 with the device 40 (step S607). When power supply to the device 40 is necessary, such as when power is drawn from the VBUS terminal of the interface 204 (step S608), and when power is not being received from the host (step S609), the wireless communication device 20 sets transmission of the power transmission request (step S610). On the other hand, when power is not drawn from the VBUS terminal, and when power is being received from the host (step S611), the wireless communication device 20 sets transmission of the power transmission termination request (step S612).

Further, when the wireless communication device 20 has received data transmitted from the device 40 (step S613), if the destination host has already been authenticated (step S614), the wireless communication device 20 sets and transmits a transmission request to the host (step S615). When the transmission time for control information such as a beacon has arrived (step S616), the wireless communication device 20 transmits the control information (step S617). When the transmission time of the device itself for data transmission has arrived (step S618), the wireless communication device 20 transmits data during the time period (step S619).

Further, during a beacon period, or when the reception time of the device itself for receiving data from a host has arrived (step S620), the wireless communication device 20 performs reception processing of the information sent during the time period (step S621). When the wireless communication device 20 has received information at step S621 (step S622), it performs the following processes according to the received information.

For example, when the wireless communication device 20 has received a beacon including the power transmission response information element from the host (step S623), it performs power reception setting in accordance with the content of the power transmission response information element (step S624).

When the wireless communication device 20 has received the MMC of the host (step S625), if the MMC has been sent from the authenticated and registered host (step S626), and if the reception time setting (Data Out) addressed to the device itself is described in the MMC (step S627), the wireless communication device 20 sets the data reception time of the device itself (step S628). Further, if the transmission time setting (Data In/Handshake Out) addressed to the device itself is described in the MMC (step S629), the wireless communication device 20 sets the data transmission time of the device itself at that time (step S630).

Further, when power has been transmitted from the host after transmitting the power transmission request (step S631), the wireless communication device 20 supplies power to the device 40 connected thereto (step S632).

On the other hand, when an existing host connected to the wireless communication device 20 no longer exists (step S633), the wireless communication device 20 deletes the registration relating to the host (step S634). In this case, if the wireless communication device 20 is receiving power from the host (step S635), it terminates power supply to the device 40 (step S636). Then, the wireless communication device 20 returns to the process at step S607 again, and repeats a series of processes.

7. CONCLUSION

As described above, the wireless communication function and the power exchange function are incorporated in the wireless communication devices 10 and 20. Thus, the wireless communication devices 10 and 20 can transmit or receive power according to need. As a result, for example, power can be transmitted from the wireless communication device 10 to the wireless communication device 20, and the wireless communication device 20 can supply the power received from the wireless communication device 10 to the device 40, thereby causing the device 40 to operate.

In addition, if the power supply function is added to the wireless USB system, power supply from the host device 30 to the device 40 can be achieved.

Moreover, the wireless communication device 10 controls whether or not to transmit power to the wireless communication device 20 depending on the connection state with the wireless communication device 20. Accordingly, the wireless communication device 10 can selectively transmit electric power to the wireless communication device 20 or to the device 40 connected to the wireless communication device 20. For example, the wireless communication device 10 can achieve power transmission to devices under the control of the host device 30, by transmitting power only to the devices that have been authenticated by the host device 30 of the wireless USB.

Furthermore, even when the host device 30 of the wireless USB is being driven by a secondary battery such as a battery, the wireless communication device 10 controls the transmission of electric power depending on the power source state of the host device 30. Therefore, the wireless communication device 10 can selectively transmit electric power only to minimum necessary devices.

It should be understood by those skilled in the art that various modifications, combinations, sub-combinations and alterations may occur depending on design requirements and other factors insofar as they are within the scope of the appended claims or the equivalents thereof.

For example, the power exchange system described in this specification, or each step of the processing performed by the wireless communication devices 10 and 20 does not have to be performed in a time series in line with the order described in the sequence diagram or the flow charts. For example, the power exchange system or each step of the processing performed by the wireless communication devices 10 and 20 may include processing that is performed in parallel or individually (for example, parallel processing or object oriented processing).

Note that, a computer program can also be created that causes hardware such as a CPU, a ROM, and a RAM that are built-in to the wireless communication devices 10 and 20 to perform functions that are the same as each structural element of the above-described wireless communication devices 10 and 20. A storage medium that stores the computer program is also provided. If each function block shown by the functional block diagrams in FIG. 6 and FIG. 15 is structured by hardware, a series of processing can be realized by hardware.

The present application contains subject matter related to that disclosed in Japanese Priority Patent Application JP 2008-098612 filed in the Japan Patent Office on Apr. 4, 2008, the entire content of which is hereby incorporated by reference.

What is claimed is:

1. A power exchange system, comprising:
   a first power exchange device; and
   a second power exchange device,
   wherein the first power exchange device comprises:
      a connection portion that is connected to a processing device;
      a wireless communication portion that performs wireless communication with the second power exchange device in a vicinity;
      a power exchange portion that exchanges power with the second power exchange device in the vicinity during one or more power exchange time slots;
      a power management portion that causes the power exchanged by the power exchange portion to be input and output between the connection portion and the processing device;
      a power control portion that, after the wireless communication portion has performed the wireless communication with the second power exchange device in the vicinity, controls whether to cause the power exchange portion to exchange power with the second power exchange device in the vicinity depending on a power source state of the processing device; and
      a protocol control portion that generates power transmission request information, wherein the power transmission request information comprises:
         a power transmission source address that specifies the power exchange device that transmits power and the power exchange device that receives power;
         a power reception format that specifies the format used to receive transmitted power;
         a desired power reception amount that indicates an amount of power that the receiving power exchange device desires to receive; and
         one or more power reception time slots during which the receiving power exchange device desires to receive power.

2. The power exchange system according to claim 1, wherein
   the power control portion controls whether to cause the power exchange portion to exchange power after an authentication process with the second power exchange device in the vicinity has been performed via the wireless communication portion.

3. The power exchange system according to claim 1, wherein when the wireless communication portion has received from the second power exchange device in the vicinity a power transmission request that requests power transmission, the power control portion controls whether to cause the power exchange portion to transmit power to the second power exchange device in the vicinity depending on a power source state of the processing device.

4. The power exchange system according to claim 3, wherein
the power transmission request includes, as a condition relating to power transmission, at least one of an amount of power, a format of power transmission, and information indicating a time slot during which transmission is required, and
when the power control portion causes the power exchange portion to transmit power to the second power exchange device in the vicinity, the power control portion causes the power exchange portion to transmit power based on the condition relating to the power transmission.

5. The power exchange system according to claim 1, wherein the first power exchange device comprises:
a communication control portion that causes the wireless communication portion to transmit a power transmission request that requests the second power exchange device in the vicinity to transmit power when the power control portion determines that the second power exchange device in the vicinity will transmit power.

6. A power exchange method comprising the steps of:
a first power exchange device performing wireless communication with a second power exchange device in a vicinity;
determining whether to exchange power based on a power source state of a processing device that is connected by a connection portion to the first power exchange device;
the first power exchange device exchanging power with the second power exchange device in the vicinity during one or more power exchange time slots when it is determined that power is to be exchanged;
causing the power that is exchanged with the second power exchange device in the vicinity to be input into and output from the processing device; and
generating power transmission request information, wherein the power transmission request information comprises:
a power transmission source address that specifies the power exchange device that transmits power and the power exchange device that receives power;
a power reception format that specifies the format used to receive transmitted power;
a desired power reception amount that indicates an amount of power that the receiving power exchange device desires to receive; and
one or more power reception time slots during which the receiving power exchange device desires to receive power.

7. A non-transitory computer-readable medium which stores a program which, when executed by a computer, is configured to perform steps comprising:
connecting a connection portion to a processing device;
performing wireless communication with a power exchange device in a vicinity;
exchanging power with the power exchange device in the vicinity;
inputting and outputting the power exchanged by a power exchange portion between the connection portion and the processing device;

controlling, after a wireless communication portion has performed the wireless communication with the power exchange device in the vicinity, whether to cause the power exchange portion to exchange power with the power exchange device in the vicinity during one or more power exchange time slots depending on a power source state of the processing device; and
generating power transmission request information with a protocol control portion, wherein the transmission request information comprises:
a power transmission source address that specifies the power exchange device that transmits power and the power exchange device that receives power:
a power reception format that specifies the format used to receive transmitted power:
a desired power reception amount that indicates an amount of power that the receiving power exchange device desires to receive; and
one or more power reception time slots during which the receiving power exchange device desires to receive power.

8. A power exchange system, comprising:
a power receiving device that includes
a first connection portion that is connected to a power using device,
a first wireless communication portion that performs wireless communication,
a power receiving portion that receives transmitted power,
a first power management portion that causes the power received by the power receiving portion to be output from the first connection portion to the power using device, and
a protocol control portion that generates power transmission request information comprising:
a power transmission source address that specifies the power receiving device and a power transmission device;
a power reception format that specifies the format used to receive transmitted power;
a desired power reception amount that indicates an amount of power that the power receiving device desires to receive; and
one or more power reception time slots during which the power receiving device desires to receive power; and
the power transmission device that includes
a second connection portion that is connected to a power supply device,
a second wireless communication portion that performs wireless communication with the first wireless communication portion of the power receiving device,
a power transmission portion that transmits to the power receiving device power supplied from the power supply device during the one or more power reception time slots, and
a power control portion that, after the second wireless communication portion has performed the wireless communication with the first wireless communication portion of the power receiving device, controls whether to cause the power transmission portion to transmit power to the power receiving device during the one or more power reception time slots, depending on a power source state of one of the power using device and the power supply device.

9. The power exchange system according to claim 1, wherein the protocol control portion generates power transmission response information comprising one or more power transmission time slots.

10. The power exchange system according to claim 9, wherein power is exchanged during the one or more power transmission time slots.

11. The power exchange system according to claim 1, wherein the power exchange system comprises a plurality of power exchange devices and power is exchanged in a time sharing manner.

12. The power exchange system according to claim 1, wherein when the wireless communication portion has received a power transmission termination request from one of a power using device or a power supply device, the power control portion terminates power transmission from the power transmission portion.

\* \* \* \* \*